(12) United States Patent
Soma et al.

(10) Patent No.: US 11,313,005 B2
(45) Date of Patent: Apr. 26, 2022

(54) SEAMLESS STEEL PIPE AND METHOD FOR PRODUCING THE SEAMLESS STEEL PIPE

(71) Applicant: Nippon Steel & Sumitomo Metal Corporation, Tokyo (JP)

(72) Inventors: Atsushi Soma, Tokyo (JP); Yuji Arai, Tokyo (JP); Yosuke Tatebayashi, Tokyo (JP); Keisuke Furo, Tokyo (JP); Takenori Kuramoto, Tokyo (JP); Hiroki Kamitani, Tokyo (JP); Kouji Yamane, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 430 days.

(21) Appl. No.: 16/301,558

(22) PCT Filed: May 18, 2017

(86) PCT No.: PCT/JP2017/018618
§ 371 (c)(1),
(2) Date: Nov. 14, 2018

(87) PCT Pub. No.: WO2017/200033
PCT Pub. Date: Nov. 23, 2017

(65) Prior Publication Data
US 2019/0300979 A1    Oct. 3, 2019

(30) Foreign Application Priority Data

May 20, 2016   (JP) .............................. JP2016-101931

(51) Int. Cl.
*C21D 8/10* (2006.01)
*C21D 9/08* (2006.01)
(Continued)

(52) U.S. Cl.
CPC ................. *C21D 8/10* (2013.01); *B21B 19/04* (2013.01); *C21D 9/08* (2013.01); *C22C 38/00* (2013.01);
(Continued)

(58) Field of Classification Search
None
See application file for complete search history.

(56) References Cited

U.S. PATENT DOCUMENTS

2008/0121318 A1* 5/2008 Arai ..................... C22C 38/02
                                                        148/593
2019/0063641 A1* 2/2019 Arai ..................... C22C 38/16

FOREIGN PATENT DOCUMENTS

CA    2937139 A1    12/2015
CA    2963755 A1    4/2016
(Continued)

OTHER PUBLICATIONS

English Abstract of CN102365376A.

*Primary Examiner* — Adam Krupicka
(74) *Attorney, Agent, or Firm* — Banner & Witcoff, Ltd.

(57) ABSTRACT

The seamless steel pipe of the present embodiment consists of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, and Ti: 0.002 to 0.050%, the balance being Fe and impurities. In a main body region of the seamless steel pipe, a grain size number of prior-austenite grain conforming to ASTM E112 is 7.0 or more, a difference between a maximum value and a minimum value of the grain size number is 1.0 or less, yield strength is 655 to less than 862 MPa, and a difference between a maximum value and a minimum value of tensile strength is 27.6 MPa or less.

28 Claims, 2 Drawing Sheets

(51) Int. Cl.
    *C22C 38/04*     (2006.01)
    *C22C 38/06*     (2006.01)
    *C22C 38/02*     (2006.01)
    *C22C 38/24*     (2006.01)
    *C22C 38/26*     (2006.01)
    *C22C 38/28*     (2006.01)
    *C22C 38/32*     (2006.01)
    *C22C 38/22*     (2006.01)
    *B21B 19/04*     (2006.01)
    *C22C 38/00*     (2006.01)
    *F16L 9/02*     (2006.01)

(52) U.S. Cl.
    CPC .......... *C22C 38/002* (2013.01); *C22C 38/005* (2013.01); *C22C 38/02* (2013.01); *C22C 38/04* (2013.01); *C22C 38/06* (2013.01); *C22C 38/24* (2013.01); *C22C 38/26* (2013.01); *C22C 38/28* (2013.01); *F16L 9/02* (2013.01); *C22C 38/22* (2013.01); *C22C 38/32* (2013.01)

(56) References Cited

FOREIGN PATENT DOCUMENTS

| CN | cn | 2/2012 |
|----|----|--------|
| JP | 2007-31756 A | 2/2007 |
| WO | 2008123422 A1 | 10/2008 |

\* cited by examiner

SEAMLESS STEEL PIPE AND METHOD FOR PRODUCING THE SEAMLESS STEEL PIPE

TECHNICAL FIELD

The present invention relates to a seamless steel pipe and a method for producing the seamless steel pipe.

BACKGROUND ART

With exhaustion of wells (oil wells and gas wells) with low corrosiveness, development of a well with high corrosiveness (hereinafter, referred to as a highly corrosive well) has been advanced. A highly corrosive well is an environment containing a lot of corrosive substances, and the temperature of the highly corrosive well is from a normal temperature to approximately 200° C. The corrosive substances are, for example, corrosive gas such as a hydrogen sulfide. A hydrogen sulfide causes sulfide stress cracking (Sulfide Stress Cracking, hereinafter referred to as "SSC") in oil country tubular goods formed of a seamless steel pipe of a low-alloy steel with high strength. Therefore, the seamless steel pipes for use in the highly corrosive wells are required to have high SSC resistance.

On the other hand, high strength is also required for the oil country tubular goods for use in the aforementioned highly corrosive wells. However, SSC resistance and strength are characteristics that are contrary to each other in general. Therefore, if the strength of a seamless steel pipe is increased, the SSC resistance of the seamless steel pipe decreases. Main yield strength required for the oil country tubular goods for use in the aforementioned highly corrosive well is from 95 ksi (655 MPa) to less than 125 ksi (862 MPa). Accordingly, there is a demand for a seamless steel pipe that has excellent SSC resistance in a highly corrosive well even though the seamless steel pipe has high yield strength of 655 MPa to less than 862 MPa.

In order to enhance the strength of oil country tubular goods, quenching and tempering are carried out on a hollow shell after hot rolling. As for quench, there are two methods that are offline quenching, and inline quenching.

Offline quenching is carried out by the following method. After a hollow shell is produced by hot rolling (piercing, elongating, and sizing), the hollow shell is cooled to a normal temperature. Thereafter, the hollow shell at the normal temperature is reheated, and quenching (rapid cooling) is carried out. In this case, a quenching apparatus is arranged in what is called offline, separately from a pipe-making line including a piercing mill, an elongating mill and a sizing mill, and a conveyance line connecting these rolling mills. In offline quenching, during heating before quench, reverse transformation from ferrite to austenite occurs in the steel. Thereby, the structure of the steel is refined, and SSC resistance is enhanced. However, in the case of offline quenching, after the hollow shell after hot rolling is cooled to a vicinity of the normal temperature, the hollow shell is reheated in an offline quenching apparatus, and quenching is carried out. Therefore, productivity is low.

On the other hand, in "inline quenching" that carries out quenching on the pipe-making line, productivity can be enhanced. In the inline quenching, a quenching apparatus is located on the conveyance line in the pipe-making line. After a hollow shell is produced by a pipe-making step (piercing, elongating, sizing, and the like), quenching is carried out on the pipe-making line directly or after the hollow shell is slightly heated by a holding furnace, without being cooled to the normal temperature. In inline quenching, productivity can be enhanced although reverse transformation cannot be used as in the offline quenching. Therefore, a seamless steel pipe that can be produced not only by offline quenching but also by inline quenching, and can achieve both high strength and excellent SSC resistance is desired.

Methods for enhancing production efficiency of seamless steel pipes having high strength and excellent SSC resistance by carrying out inline quenching are disclosed in Japanese Patent Application Publication No. 2007-31756 (Patent Literature 1) and International Application Publication No. WO2008/123422 (Patent Literature 2).

Patent Literature 1 uses ingot consisting of in mass %, C: 0.15 to 0.20%, Si: 0.01% or more to less than 0.15%, Mn: 0.05 to 1.0%, Cr: 0.05 to 1.5%, Mo: 0.05 to 1.0%, Al: 0.10% or less, V: 0.01 to 0.2%, Ti: 0.002 to 0.03%, B: 0.0003 to 0.005% and N: 0.002 to 0.01%, the balance being Fe and impurities. The ingot is heated to a temperature of 1000 to 1250° C., a final rolling temperature is set at 900 to 1050° C. and pipe-making rolling is finished. Thereafter, quenching is directly performed from a temperature of an $Ar_3$ transformation point or more, or, after the pipe-making rolling is finished, concurrent heating is performed to an $Ac_3$ transformation point to 1000° C. inline and quenching is performed from the temperature of the $Ar_3$ transformation point or more. Thereafter, tempering is performed in a temperature range from 600° C. to an $Ac_1$ transformation point. Patent Literature 1 indicates that the seamless steel pipe produced by the production method has strength in a grade of 110 ksi (758 to 861 MPa), and has high strength, excellent toughness and SSC resistance.

Patent Literature 2 uses a billet consisting of in mass %, C: 0.10 to 0.20%, Si: 0.05 to 1.0%, Mn: 0.05 to 1.5%, Cr: 1.0 to 2.0%, Mo: 0.05 to 2.0%, Al: 0.10% or less and Ti: 0.002 to 0.05%, a value of Ceq obtained by Ceq=C+(Mn/6)+(Cr+Mo+V)/5 being 0.65 or more, the balance being Fe and impurities, P in the impurities being 0.025% or less, S being 0.010% or less, N being 0.007% or less and B being less than 0.0003%. After the billet is pierced as a hot processing and elongated, the billet is rolled so that a final rolling temperature is 800 to 1100° C. The obtained steel pipe is subjected to concurrent heating in a temperature range from the $Ar_3$ transformation point to 1000° C. inline, is quenched from a temperature of the $Ar_3$ transformation point or more, and subsequently is tempered at a lower temperature than the $Ac_1$ transformation point. Patent Literature 2 indicates that the seamless steel pipe produced by the production method has high strength, excellent toughness and SSC resistance.

CITATION LIST

Patent Literature

Patent Literature 1: Japanese Patent Application Publication No. 2007-31756
Patent Literature 2: International Application Publication No. WO2008/123422

SUMMARY OF INVENTION

Technical Problem

However, in Patent Literature 1 and Patent Literature 2, excellent SSC resistance may not be obtained. Further, in a seamless steel pipe that is used as oil country tubular goods for use in a highly corrosive well, suppression of strength variation in a circumferential direction and an axial direction is also required for quality control. Especially when inline quenching is carried out in a production process, stable yield strength may not be obtained.

An object of the present invention is to provide a seamless steel pipe capable of achieving both high yield strength of 95 ksi (655 MPa) to less than 125 ksi (862 MPa) and excellent SSC resistance, and suppressing strength variation in a circumferential direction and an axial direction, and a method for producing the seamless steel pipe.

Solution to Problem

A seamless steel pipe according to the present embodiment is a seamless steel pipe having a first pipe end and a second pipe end. A chemical composition of the present seamless steel pipe consists of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities. In the seamless steel pipe, a grain size number of prior-austenite grain conforming to ASTM E112 is 7.0 or more in a main body region excluding a first pipe end region and a second pipe end region, the first pipe end region ranging to a position 500 mm away from the first pipe end in an axial direction of the seamless steel pipe toward the second pipe end, the second pipe end region ranging to a position 500 mm away from the second pipe end in an axial direction of the seamless steel pipe toward the first pipe end, a difference between a maximum value and a minimum value of the grain size number in the main body region is 1.0 or less, yield strength in the main body region is 655 to less than 862 MPa, and a difference between a maximum value and a minimum value of tensile strength in the main body region is 27.6 MPa or less.

A method for producing a seamless steel pipe according to the present embodiment includes a step of heating a round billet to 950 to 1100° C., the round billet consisting of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities, a pipe-making step of piercing the round billet by using a piercing mill having skew rolls, rotational frequencies of the skew rolls being set at 20 to 75 rpm, and further carrying out rolling to produce a hollow shell, wherein a temperature of hollow shell during final rolling is 800 to 1000° C., a quenching step of rapidly cooling the hollow shell produced in the pipe-making step and having an outer surface temperature of an $A_3$ transformation point to 1000° C., wherein an average cooling rate until the outer surface temperature reaches 300° C. from the outer surface temperature of the hollow shell at a start of rapid cooling is 15° C./second or more, and a tempering step of carrying out tempering by holding the outer surface temperature of the hollow shell that has been rapidly cooled in the quenching step at a temperature ranging from 650° C. to an $Ac_1$ transformation point to produce a seamless steel pipe having yield strength of 655 to less than 862 MPa.

A method for producing a seamless steel pipe according to the present embodiment includes a step of heating a round billet to 950 to 1100° C., the round billet consisting of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities, a pipe-making step of piercing the round billet by using a piercing mill having skew rolls, circumferential speeds of the skew rolls being set at 1450 to 5550 mm/second, and further carrying out rolling to produce a hollow shell, wherein a temperature of the hollow shell during final rolling is 800 to 1000° C., a quenching step of rapidly cooling the hollow shell produced in the pipe-making step and having an outer surface temperature of an $A_3$ transformation point to 1000° C., wherein an average cooling rate until the outer surface temperature reaches 300° C. from the outer surface temperature of the hollow shell at a start of rapid cooling is 15° C./second or more, and a tempering step of carrying out tempering by holding the outer surface temperature of the hollow shell that has been rapidly cooled in the quenching step at a temperature ranging from 650° C. to the $Ac_1$ transformation point to produce a seamless steel pipe having yield strength of 655 to less than 862 MPa.

Advantageous Effects of Invention

The seamless steel pipe according to the present embodiment can achieve both high yield strength of 95 ksi (655 MPa) to less than 125 ksi (862 MPa), and excellent SSC resistance, and can suppress strength variation in a circumferential direction and an axial direction. The production method according to the present embodiment can produce the above described seamless steel pipe.

DESCRIPTION OF EMBODIMENTS

Figure 1:
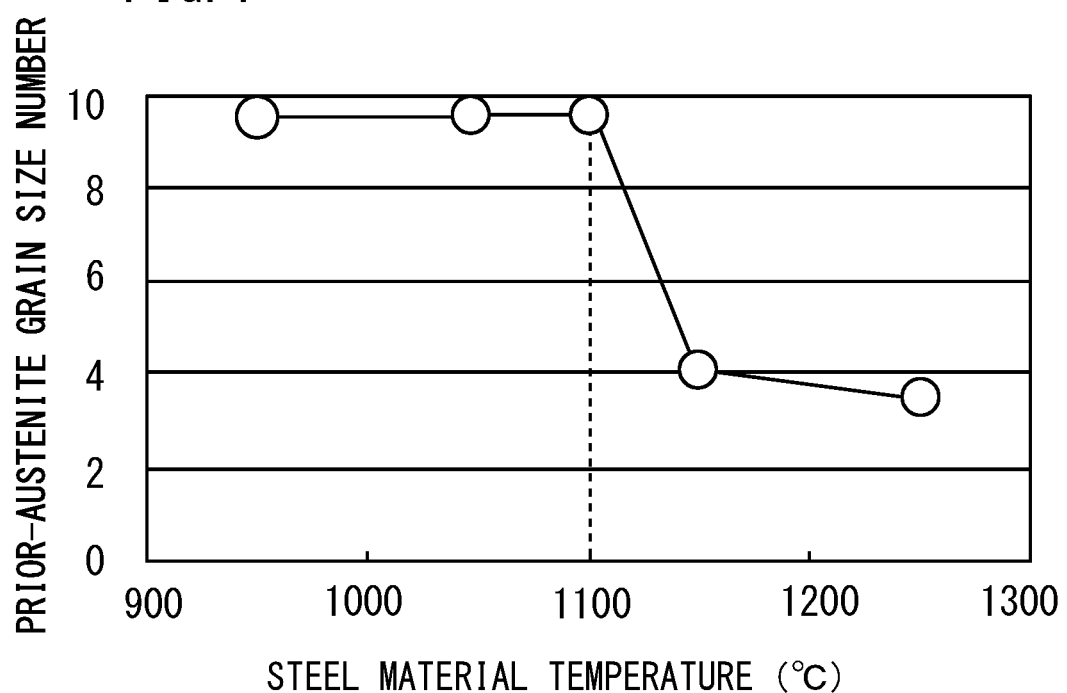
FIG. 1 is a diagram illustrating a relationship between a steel material temperature during hot working and a grain size number of prior-austenite grain with a hollow shell during pipe-making being assumed.

The present inventors studied a method for obtaining excellent SSC resistance in a seamless steel pipe having high yield strength of 95 ksi (655 MPa) to less than 125 ksi (862 MPa). As a result, the present inventors obtained the following finding.

[SSC Resistance]

In a seamless steel pipe having high yield strength of 95 ksi (655 MPa) to less than 125 ksi (862 MPa), grain is refined by Nb to enhance SSC resistance. Nb forms carbo-nitride, carbide and nitride. Fine carbo-nitride, carbide and nitride containing Nb suppress coarsening of prior-austenite grain and promote grain refinement of the prior-austenite grain during hot rolling. Nb further increases a recrystallization temperature. When the recrystallization temperature increases, a non-recrystallization temperature region is enlarged and recrystallization is retarded. As a result, the prior-austenite grain is further refined. The seamless steel pipe of the present embodiment contains 0.010 to 0.050% of Nb, and thereby suppresses coarsening of the austenite grain during hot rolling by using a pinning effect of an Nb carbo-nitride and the like. Thereby, a grain size number of a prior-austenite grain conforming to ASTM E112 is made 7.0 or more in a main body region excluding a first pipe end region and a second pipe end region, the first pipe end region ranging to a position 500 mm away from the first pipe end in an axial direction of the seamless steel pipe toward the second pipe end, the second pipe end region ranging to a position 500 mm away from the second pipe end in an axial direction of the seamless steel pipe toward the first pipe end of the seamless steel pipe, and a difference between a maximum value and a minimum value of the grain size number (hereinafter, referred to as a grain size difference ΔGS) is made 1.0 or less. As a result, excellent SSC resistance can be obtained on the premise that yield strength is 655 MPa to less than 862 MPa.

[Strength Variation]

Strength variation in the circumferential direction and the axial direction of the seamless steel pipe is due to a ratio of Nb (hereinafter, referred to as an Nb solid solution rate) that is dissolved in steel without being precipitated as Nb carbo-nitride or Nb nitride in a hollow shell before a tempering step after a quenching step. In the hollow shell before the tempering step after the quenching step, as variation in Nb solid solution rate in the circumferential direction and the axial direction is smaller, strength variation in the axial direction of the seamless steel pipe after the tempering step can be reduced. Specifically, if a difference between a maximum value and a minimum value of the Nb solid solution rate in the circumferential direction and the axial direction of the main body region of the hollow shell before the tempering step after the quenching step (hereinafter, referred to as an Nb solid solution rate difference ΔSR) is 10% or less, a difference between a maximum value and a minimum value of tensile strength in the circumferential direction and the axial direction in the main body region of the seamless steel pipe after the tempering step (hereinafter, referred to as a tensile strength difference ΔTS) is 27.6 MPa or less, and strength variation can be sufficiently suppressed.

The seamless steel pipe having the aforementioned characteristics (the yield strength is 655 to less than 862 MPa, the grain size number of the prior-austenite grain conforming to ASTM E112 is 7.0 or more, the grain size difference ΔGS is 1.0 or less, and the tensile strength difference ΔTS is 27.6 MPa or less) can be produced by inline quenching or offline quenching by satisfying the following production conditions.

When the seamless steel pipe is produced by inline quenching, production efficiency can be enhanced, and energy saving is enabled. However, in inline quenching, reverse transformation as in offline quenching cannot be used in refinement of austenite grain. Therefore, the present inventors investigated and studied a method for refining prior-austenite grain without using reverse transformation. At first, the present inventors investigated a relationship between a hollow shell temperature and a prior-austenite grain diameter in a case where the hollow shell is produced with a rolling ratio (final finishing length/billet length) during a normal pipe-making step of 1.6 to 13.0 (a rolling reduction ratio in a piercing step is 1.2 to 4.0).

FIG. 1 is a diagram illustrating a relationship between a steel material temperature during hot working and a prior-austenite grain size number conforming to ASTM E112 when a hollow shell during a hot rolling is assumed. FIG. 1 is obtained by the following method. A steel material (steel plate) satisfying the aforementioned chemical composition is produced. A test specimen in a round bar shape with a diameter of 8 mm×a length of 12 mm was extracted from the steel plate. A hot working test (THERMECMASTOR test) was carried out for the test specimen. As the test apparatus, a THERMECMASTOR Z (trade name) test machine made by Fuji Electronic Industrial Co., Ltd. was used. An environment of a compression test was under a vacuum atmosphere. The test specimen was heated to a predetermined temperature. After the test specimen had the predetermined temperature, the test specimen was soaked for five minutes while predetermined strain (length change 50%) with a rolling ratio during normal pipe-making assumed was being applied to the test specimen. After being soaked, the test specimen was rapidly cooled by He gas. A prior-austenite grain diameter was measured in a center portion of the test specimen after rapid cooling, and an average value thereof was defined as the prior-austenite grain diameter (μm). The obtained prior-austenite grain diameter was converted into a grain size number of prior-austenite grain conforming to ASTM E112. FIG. 1 was made based on the obtained prior-austenite grain size number.

Referring to FIG. 1, in a steel material of the above described chemical composition in which the yield strength of 655 MPa to less than 862 MPa is obtained, the prior-austenite grain size number in the steel material after hot working becomes 4.0 or less when the steel material temperature in the hot working (in pipe making) is higher than 1100° C. That is, the prior-austenite grain becomes coarse. On the other hand, when the steel material temperature in the hot working is at the $A_3$ transformation point or more to 1100° C. or less, the prior-austenite grain size number in the steel material after the hot working is 9.0 or more and substantially constant. That is, the grain size number of the prior-austenite grain changes discontinuously with the steel material temperature during the hot rolling being in a vicinity of 1100° C. Accordingly, even when refinement of the prior-austenite grain by reverse transformation is not used, if only a round billet (hollow shell) temperature in the pipe-making step can be kept at 1100° C. or less, the prior-austenite grain of the seamless steel pipe after pipe making can be made 7.0 or more in grain size number conforming to ASTM E112.

The reason why the prior-austenite grain of the seamless steel pipe after pipe-making becomes 7.0 or more in grain size number conforming to ASTM E112 if the hollow shell temperature during the pipe-making is 1100° C. or less is conceivable as follows.

During the hot pipe-making, Nb in the steel combines with carbon and/or nitrogen to form fine Nb carbo-nitrides and the like. In the hot rolling, Nb carbo-nitrides and the like exhibit a pinning effect to restrain austenite grain from coarsening, and keep the austenite grain in a fine state. However, if the hollow shell temperature in the pipe-making becomes more than 1100° C., Nb carbo-nitrides and the like that are generated once are dissolved. In this case, the pinning effect by the Nb carbo-nitrides and the like cannot be obtained, so that the austenite grain is coarsened. As a result, the prior-austenite grain of the seamless steel pipe after rolling becomes less than 7.0 in grain size number conforming to ASTM E112.

Incidentally, in pipe-making, processing-incurred heat is generated when a material (a round billet, a hollow shell) is worked. The present inventors paid attention to the processing-incurred heat. Even if the heating temperature of a round billet before hot rolling is set at 1100° C. or less, if processing-incurred heat is unevenly generated in the axial direction and the circumferential direction of the hollow shell, and a portion having a temperature of more than 1100° C. occurs in a part of the hollow shell, the following phenomenon occurs. In the portion having a temperature of more than 1100° C. by the processing-incurred heat, Nb carbo-nitrides and the like are dissolved as described above. Although a part of the dissolved Nb is precipitated in a subsequent step, a precipitation amount of Nb carbo-nitride decreases as compared with portions having no processing-incurred heat. As a result, the prior-austenite grain is coarsened in this portion. On the other hand, in the portions having a temperature of less than 1100° C., Nb carbo-nitrides and the like exhibit a pining effect, so that the prior-austenite grain becomes fine. As a result, the grain size difference ΔGS of the prior-austenite grain becomes more than 1.0, and SSC resistance is reduced.

Therefore, the present inventors studied a method for suppressing processing-incurred heat. A pipe-making step includes a piercing step and a rolling step. The rolling step includes, for example, an elongating step, and a sizing step that is carried out after the elongating step. In the piercing step, a round billet is pierced and rolled by using a piercing mill to be formed into a hollow shell. In the elongating step, the hollow shell is elongated by using a elongating mill. The elongating mill is, for example, a plug mill, or a mandrel mill. In the sizing step, the hollow shell is subjected to diameter adjusting rolling by using a sizing mill. The sizing mill is, for example, a sizer or a stretch reducer.

In the pipe-making step, even in the case where the round billet which is a starting material is heated to 1100° C. or less in a heating furnace, processing-incurred heat is generated in the piercing step, or the rolling step, and as a result, a starting material temperature may become more than 1100° C. In this case, as described above, the prior-austenite grain is coarsened, and the grain size difference ΔGS increases.

In the pipe-making step, the step in which the rolling ratio is the highest is the piercing step, out of the piercing step and the rolling step. In the piercing step, the round billet is pierced and rolled by using a piercing mill having a pair of skew rolls. At this time, a rotating speed (rpm) of the skew rolls is related to a processing-incurred heat amount. Specifically, when a circumferential speed of the skew rolls is high, processing-incurred heat increases, and when the circumferential speed is low, the processing-incurred heat is suppressed.

Therefore, in the present embodiment, in the pipe-making step, the heating temperature of the round billet is set at 1100° C. or less, and further, in the piercing step, a rotational frequency of the skew rolls of the piercing mill in which a roll diameter of a gorge portion is 1390 to 1410 mm is set at 75 rpm or less. In this case, in the pipe-making step, the round billet (hollow shell) temperature hardly becomes more than 1100° C. by the processing-incurred heat. Therefore, Nb carbo-nitrides and the like that are generated in the piercing step are not dissolved again, and exhibit a pining effect in the pipe-making step. Consequently, the prior-austenite grain can be refined without using the reverse transformation, and the grain size difference ΔGS can be decreased.

Further, a finishing temperature (an outer surface temperature of the hollow shell at a rolling stand exit side of final rolling) during final rolling in the pipe-making step is set at 1000° C. or less. In this case, even if processing-incurred heat is generated during the pipe-making step, the hollow shell temperature hardly becomes more than 1100° C. in the entire pipe-making step. Therefore, the prior-austenite grain of the seamless steel pipe can be refined, and the grain size difference ΔGS can be also decreased.

If in the pipe-making step, the heating temperature of the round billet which is a starting material is set at 1100° C. or less, the rotational frequency of the skew rolls in the piercing step is set at 75 rpm or less (5550 mm/second or less in the circumferential speed of the skew rolls), and the finishing temperature of the pipe-making step is set at 1000° C. or less, the Nb solid solution rate difference ΔSR in the hollow shell before the tempering step after the quenching step can be sufficiently decreased to be 10% or less. Consequently, a tensile strength difference ΔTS in the circumferential direction and the axial direction of the seamless steel pipe can be sufficiently decreased to be 27.6 MPa or less.

The seamless steel pipe according to the present embodiment which is completed based on the above finding is a seamless steel pipe having the first pipe end and the second pipe end. A chemical composition of the present seamless steel pipe consists of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities. In the seamless steel pipe, the grain size number of the prior-austenite grain conforming to ASTM E112 is 7.0 or more in the main body region except for the first pipe end region and the second pipe end region, the first pipe end region ranging to a position 500 mm away from the first pipe end in the axial direction of the seamless steel pipe toward the second pipe end, the second pipe end region ranging to a position 500 mm away from the second pipe end in the axial direction of the seamless steel pipe toward the first pipe end, the difference between the maximum value and the minimum value of the grain size number in the main body region is 1.0 or less, the yield strength in the main body region is 655 to less than 862 MPa, and the difference between the maximum value and the minimum value of the tensile strength in the main body region is 27.6 MPa or less.

The chemical composition of the aforementioned seamless steel pipe may contain V: 0.01 to 0.30%. Further, the chemical composition of the aforementioned seamless steel pipe may contain one or more elements selected from a group consisting of Ca: 0.0001 to 0.0050%, and rare earth metal: 0.0001 to 0.0050%.

The method for producing the seamless steel pipe according to the present embodiment includes the step of heating a round billet to 950 to 1100° C., the round billet consisting of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities, a pipe-making step of piercing the round billet by using a piercing mill having skew rolls, and setting a rotational frequency of the skew rolls at 20 to 75 rpm, and further carrying out rolling to produce a hollow shell, wherein a temperature of the hollow shell during final rolling is 800 to 1000° C., a quenching step of rapidly cooling the hollow shell produced in the pipe-making step and having an outer surface temperature of an $A_3$ transformation point to 1000° C., wherein an average cooling rate until the outer surface temperature reaches 300° C. from the outer surface temperature of the hollow shell at a start of rapid cooling is 15° C./second or more, and a tempering step of carrying out tempering by holding the outer surface temperature of the hollow shell that has been rapidly cooled in the quenching step at a temperature ranging from 650° C. to an $Ac_1$ transformation point to produce a seamless steel pipe having yield strength of 655 to less than 862 MPa.

A method for producing the seamless steel pipe according to the present embodiment includes the step of heating a round billet to 950 to 1100° C., the round billet consisting of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities, a pipe-making step of piercing the round billet by using a piercing mill having skew rolls, and setting a circumferential speed of the skew rolls at 1450 to 5550 mm/second, and further carrying out rolling to produce a hollow shell, wherein a temperature of the hollow shell during final rolling is 800 to 1000° C., a quenching step of rapidly cooling the hollow shell produced in the pipe-making step and having an outer surface temperature of an $A_3$ transformation point to 1000° C., wherein an average cooling rate until the outer surface temperature reaches 300° C. from the outer surface temperature of the hollow shell at a start of rapid cooling is 15° C./second or more, and a tempering step of carrying out tempering by holding the outer surface temperature of the hollow shell that has been rapidly cooled in the quenching step at a temperature ranging from 650° C. to the $Ac_1$ transformation point to produce a seamless steel pipe having yield strength of 655 to less than 862 MPa.

The aforementioned production method may further include a concurrent heating step of heating, after the pipe-making step before the quenching step, the hollow shell produced in the pipe-making step and having the outer surface temperature of 400° C. to less than an Ara transformation point to the $Ac_3$ transformation point to 1000° C. in the outer surface temperature of the hollow shell. In this case, in the quenching step, the hollow shell heated in the concurrent heating step to have the outer surface temperature reaching the $A_3$ transformation point to 1000° C. is rapidly cooled.

The aforementioned production method may further include a reheating step of reheating, after the pipe-making step before the quenching step, the hollow shell produced in the pipe-making step and having the outer surface temperature of less than 400° C. to the $Ac_3$ transformation point to 1000° C. in the outer surface temperature of the hollow shell. In this case, in the quenching step, the hollow shell heated in the reheating step to have the outer surface temperature reaching the $A_3$ transformation point to 1000° C. is rapidly cooled.

In the aforementioned production method, the round billet may contain V: 0.01 to 0.30%. Further, the round billet may contain one or more elements selected from a group consisting of Ca: 0.0001 to 0.0050%, and rare earth metal: 0.0001 to 0.0050%.

Hereinafter, the seamless steel pipe and the method for producing the seamless steel pipe of the present embodiment will be described in detail. A sign "%" relating to elements means mass % unless otherwise noted.

[Composition of Seamless Steel Pipe]

Figure 2:
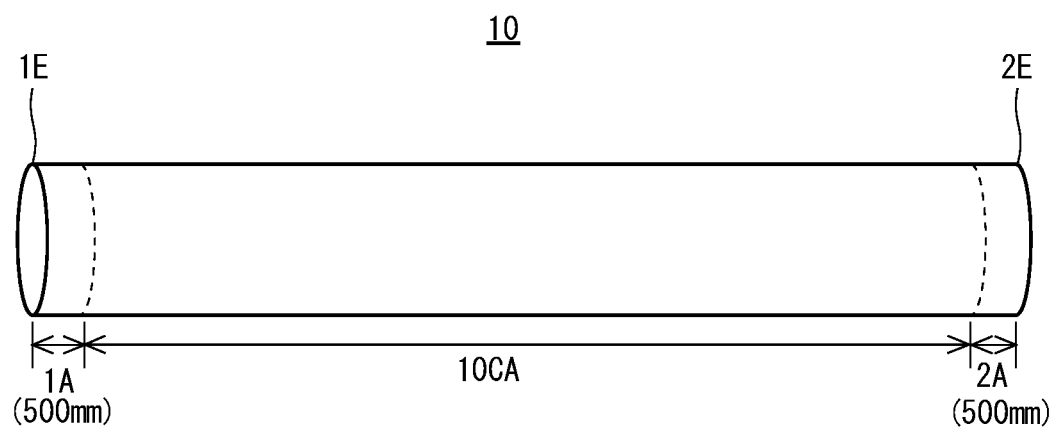
FIG. 2 is a perspective view of a seamless steel pipe of the present embodiment.

FIG. 2 is a view illustrating one example of the seamless steel pipe of the present embodiment. Referring to FIG. 2, a seamless steel pipe 10 of the present embodiment includes a first pipe end 1E and a second pipe end 2E. The second pipe end 2E is located at an opposite side of the first pipe end 1E, in an axial direction of the seamless steel pipe 10.

In FIG. 2, a range to a position 500 mm away from the first pipe end 1E in the axial direction of the seamless steel pipe 10 toward the second pipe end 2E (toward a center in the axial direction of the seamless steel pipe 10) is defined as a first pipe end region 1A. Further, a range to a position 500 mm away from the second pipe end 2E in the axial direction of the seamless steel pipe 10 toward the first pipe end 1E (toward the center in the axial direction of the seamless steel pipe 10) is defined as a second pipe end region 2A. Further, of the seamless steel pipe 10, a region excluding the first pipe end region 1A and the second pipe end region 2E is defined as a main body region 10CA.

[Chemical Composition]

A chemical composition of the seamless steel pipe of the present embodiment contain the following elements.

C: 0.21 to 0.35%

Carbon (C) enhances strength of the steel. If a C content is too low, the effect cannot be obtained. On the other hand, if the C content is too high, susceptibility to quench cracking of the steel increases. In this case, especially in quenching of the steel pipe, special cooling means (quenching method) is needed. If the C content is too high, toughness of the steel may be further reduced. Accordingly, the C content is 0.21 to 0.35%. A lower limit of the C content is preferably 0.23%, and more preferably 0.25%. An upper limit of the C content is 0.30%, and more preferably 0.27%.

Si: 0.10 to 0.50%

Silicon (Si) deoxidizes the steel. If an Si content is too low, the effect cannot be obtained. On the other hand, if the Si content is too high, SSC resistance and workability of the steel are reduced. Accordingly, the Si content is 0.10 to 0.50%. A lower limit of the Si content is preferably 0.15%, and more preferably 0.20%. An upper limit of the Si content is preferably 0.40%, and more preferably 0.35%.

Mn: 0.05 to 1.00%

Manganese (Mn) enhances hardenability of the steel, and enhances strength of the steel. If an Mn content is too low, the effect cannot be obtained. On the other hand, if the Mn content is too high, Mn is segregated in a grain boundary and SSC resistance of the steel is reduced. Accordingly, the Mn content is 0.05 to 1.00%. A lower limit of the Mn content is preferably 0.30%, and more preferably 0.40%. An upper limit of the Mn content is preferably 0.95%, and more preferably 0.90%.

P: 0.025% or Less

Phosphorus (P) is an impurity, and is inevitably contained in steel. P segregates in a grain boundary and reduces SSC resistance of steel. Accordingly, a P content is 0.025% or less. An upper limit of the P content is preferably 0.020%, and more preferably 0.015%. The P content is preferably as low as possible.

S: 0.010% or Less

Sulfur (S) is an impurity, and is inevitably contained in steel. S combines with Mn to form sulfide inclusions, and reduces SSC resistance of steel. Accordingly, the S content is 0.010% or less. An upper limit of the S content is preferably 0.006%, and more preferably 0.003%. The S content is preferably as low as possible.

Al: 0.005 to 0.100%

Aluminum (Al) deoxidizes steel. If an Al content is too low, the effect cannot be obtained. On the other hand, if the Al content is too high, the effect is saturated. If the Al content is too high, a large number of coarse Al oxides are further generated to reduce SSC resistance of the steel. Accordingly, the Al content is 0.005 to 0.100%. A lower limit of the Al content is preferably 0.010%, and more preferably 0.020%. An upper limit of the Al content is preferably 0.070%, and more preferably 0.050%. In the present specification, the Al content means a content of so-called acid-soluble Al (sol. Al).

N: 0.010% or Less

Nitrogen (N) is inevitably contained in steel. N forms nitride. Fine nitride prevents coarsening of grain, so that N may be contained. On the other hand, coarse nitride reduces SSC resistance of the steel. Accordingly, an N content is 0.010% or less. An upper limit of the N content is preferably 0.004%, and more preferably 0.003%. A preferable lower limit of the N content for obtaining a pinning effect by precipitation of fine nitrides is 0.002%.

Cr: 0.05 to 1.50%

Chrome (Cr) enhances hardenability of steel, and enhances strength of the steel. If a Cr content is too low, the effect cannot be obtained. On the other hand, if the Cr content is too high, SSC resistance of the steel is reduced. Accordingly, the Cr content is 0.05 to 1.50%. A lower limit of the Cr content is preferably 0.20%, and more preferably 0.40%. An upper limit of the Cr content is preferably 1.20%, and more preferably 1.15%.

Mo: 0.10 to 1.50%

Molybdenum (Mo) enhances hardenability of steel, and enhances strength of the steel. Mo further enhances temper softening resistance of the steel, and enhances SSC resistance by high-tempering temperature. If an Mo content is too low, the effect cannot be obtained. On the other hand, if the Mo content is too high, the effect is saturated, and production cost is increased. Accordingly, the Mo content is 0.10 to 1.50%. A lower limit of the Mo content is preferably 0.15%, and more preferably 0.20%. An upper limit of the Mo content is preferably 0.80%, and more preferably 0.60%.

Nb: 0.010 to 0.050%

Niobium (Nb) combines with C and N to form fine Nb carbo-nitride, Nb carbide, and Nb nitride. Nb further forms composite carbides with Ti and Al. These carbo-nitrides and the like (Nb carbo-nitrides, Nb carbides, and Nb nitrides, and composite carbides) refine grain by a pinning effect to enhance SSC resistance of the steel. These carbo-nitrides and the like further suppress variation in grain size. If an Nb content is too low, the effect cannot be obtained. On the other hand, if the Nb content is too high, a large number of coarse Nb inclusions are generated, and SSC resistance of the steel is reduced. Accordingly, the Nb content is 0.010 to 0.050%. A lower limit of the Nb content is preferably 0.013%, more preferably 0.015%, and further more preferably 0.020%. An upper limit of the Nb content is preferably 0.040%, and more preferably 0.035%.

B: 0.0003 to 0.0050%

Boron (B) enhances hardenability of steel, and enhances strength of the steel. If a B content is too low, the effect cannot be obtained. On the other hand, if the B content is too high, carbo-nitrides are precipitated in a grain boundary, and SSC resistance of the steel is reduced. Accordingly, the B content is 0.0003 to 0.0050%. A lower limit of the B content is preferably 0.0005%, and more preferably 0.0008%. An upper limit of the B content is preferably 0.0030%, and more preferably 0.0020%.

Ti: 0.002 to 0.050%

Titanium (Ti) combines with C and N to form fine Ti carbo-nitride, and fixes N which is an impurity. By generation of Ti nitrides, grain is refined, and strength of the steel is further enhanced. When B is contained in the steel, Ti suppresses generation of B nitrides, and therefore promotes enhancement of hardenability by B. If a Ti content is too low, these effects cannot be obtained. On the other hand, if the Ti content is too high, Ti is dissolved in Nb inclusions, and the Nb inclusions are coarsened. In this case, SSC resistance of the steel is reduced. Accordingly, a Ti content is 0.002 to 0.050%. A lower limit of the Ti content is preferably 0.003%, and more preferably 0.004%. An upper limit of the Ti content is preferably 0.035%, and more preferably 0.030%.

The balance of the chemical composition of the seamless steel pipe according to the present embodiment is Fe and impurities. Here, impurities mean those which are mixed in from ore and scrap as a raw material, a production environment or the like when the seamless steel pipe is industrially produced, and are acceptable within a range not adversely affecting the seamless steel pipe of the present embodiment. Of the impurities, an oxygen (O) content is 0.005% or less.

[Optional Elements]

The chemical composition of the aforementioned seamless steel pipe may further contain V instead of part of Fe.

V: 0 to 0.30%

Vanadium (V) is an optional element and does not have to be contained. When V is contained, V generates fine carbides to enhance temper softening resistance and enables high-tempering temperature. Thereby, SSC resistance of the steel is enhanced. However, if a V content is too high, carbides are excessively generated and SSC resistance of the steel is reduced rather. Accordingly, the V content is 0 to 0.30%. A lower limit of the V content for obtaining the above described effect more effectively is preferably 0.01%, and more preferably 0.02%. An upper limit of the V content is preferably 0.25%, and more preferably 0.20%.

The chemical composition of the aforementioned seamless steel pipe may further contain one or more elements selected from a group consisting of Ca and rare earth metal instead of part of Fe.

Ca: 0 to 0.0050%

Calcium (Ca) is an optional element, and does not have to be contained. When Ca is contained, Ca spheroidizes sulfide inclusions in steel. Thereby, SSC resistance of the steel is enhanced. If even a small amount of Ca is contained, the above described effect can be obtained. However, if a Ca content is too high, an excessively large amount of inclusions are generated, and SSC resistance of the steel is reduced. Accordingly, the Ca content is 0 to 0.0050%. A lower limit of the Ca content is preferably 0.0001%, more preferably 0.0010%, and further more preferably 0.0015%. An upper limit of the Ca content is preferably 0.0040%, and more preferably 0.0030%.

Rare Earth Metal (REM): 0 to 0.0050%

Rare earth metal (REM) is an optional element, and does not have to be contained. When REM is contained, REM spheroidizes sulfide inclusions in steel. Thereby, SSC resistance of the steel is enhanced. If even a small amount of REM is contained, the above described effect can be obtained. However, if an REM content is too high, an excessively large amount of inclusions are generated, and SSC resistance of the steel is reduced. Accordingly, the REM content is 0 to 0.0050%. A lower limit of the REM content is preferably 0.0001%, and more preferably 0.0010%. An upper limit of the REM content is preferably 0.0040%, and more preferably 0.0030%.

The REM in the present specification contains at least one or more kinds of Sc, Y, and lanthanoid (La of atomic number 57 to Lu of 71), and the REM content means a total content of these elements.

[Microstructure]

A microstructure of the seamless steel pipe of the present embodiment mainly consists of tempered martensite, the balance being, for example, ferrite, bainite, pearlite, a mixed phase of these substances or the like. Here, "mainly" means that a total area fraction of the tempered martensite in the microstructure is 90% or more.

The area fraction of the tempered martensite is proportional with the yield ratio YR of the seamless steel pipe of the present embodiment. Therefore, the area fraction of the tempered martensite is defined by the following method.

Central positions in the axial direction of categories obtained by dividing the main body region excluding the first pipe end region and the second pipe end region of the tempered seamless steel pipe into five equal parts in the axial direction of the seamless steel pipe are selected. In each of the selected positions, strip-shaped tensile test specimens are extracted from four positions at positions of pitches of 90° around a center axis of the seamless steel pipe. A cross-section of the strip-shaped tensile test specimen (section perpendicular to the axial direction of the seamless steel pipe) is strip-shaped, and an axial direction of the strip-shaped tensile test specimen is parallel with the axial direction of the seamless steel pipe. A tensile test is carried out at a normal temperature (25° C.) in conformity with 5CT specifications of the API standards by using the strip-shaped tensile test specimens. An average of yield strengths obtained by the respective strip-shaped test specimens (20 spots in total) is defined as the yield strength YS (MPa) of the seamless steel pipe. An average of the tensile strengths (20 spots in total) obtained by the respective strip-shaped test pieces is defined as the tensile strength TS (MPa) of the seamless steel pipe. Note that the yield strength YS is defined as follows. When the yield strength YS is in a 95 ksi grade (655 MPa to less than 758 MPa), a value of 0.5% total elongation is defined as yield strength (MPa). When the yield strength YS is in a 110 ksi grade (758 MPa to less than 862 MPa), a value of 0.7% total elongation is defined as yield strength (MPa). Definitions of these yield strengths are in conformity with the 5CT specifications of the API standards.

The yield ratio YR (%) is obtained from the following formula by using the yield strength YS and the tensile strength TS which are obtained.

$$YR=YS/TS\times 100$$

When the area fraction of the tempered martensite is low, that is, the area fractions of a ferrite pearlite structure and bainite structure are high, the yield ratio YR is reduced. When the obtained yield strength YS is in a 95 ksi grade (655 to less than 758 MPa), if the yield ratio YR is 85.0% or more, the area fraction of the tempered martensite is 90% or more. When the obtained yield strength YS is in a 110 ksi grade (758 to less than 862 MPa), the area fraction of the tempered martensite is 90% or more, if the yield ratio is 90.0% or more.

[Prior-Austenite Grain Size Number]

In the microstructure of the seamless steel pipe of the present embodiment, the grain size number conforming to ASTM E112 of the prior-austenite grain is 7.0 or more. If the grain size number of the prior-austenite grain is less than 7.0, the prior-austenite grain is coarse. Consequently, SSC resistance is reduced. If the size number of the prior-austenite grain is 7.0 or more, the grain is sufficiently fine. Therefore, excellent SSC resistance can be obtained. In the present embodiment, pipe is made at a lower temperature (1100° C. or less) than in the prior art in the pipe-making step, and processing-incurred heat that is generated during the piercing and rolling is suppressed, whereby the above described prior-austenite grain size number is realized.

[Method for Measuring Prior-Austenite Grain Size Number]

Figure 3:
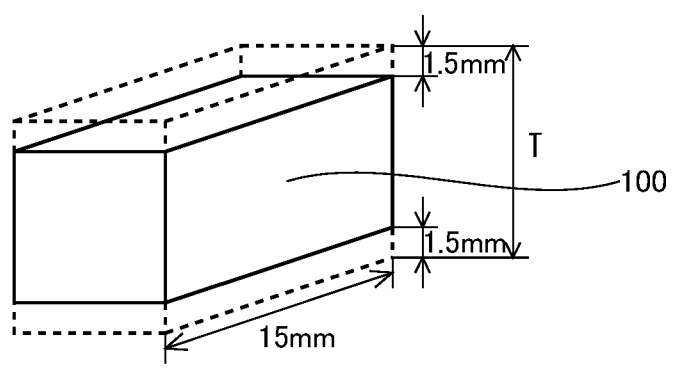
FIG. 3 is a perspective view of a test specimen which is used when a prior-austenite grain size is measured.

A method for measuring the prior-austenite grain size is as follows. Central positions in the axial direction of respective categories obtained by dividing the main body region excluding the first pipe end region and the second pipe end region of the seamless steel pipe into five equal parts in the axial direction of the seamless steel pipe are selected. In a section perpendicular to the axial direction of the seamless steel pipe in each of the selected positions, test specimens each having a surface (observation surface) 100 parallel with the axial direction of the seamless steel pipe are produced from wall thickness center positions of eight positions at positions of pitches of 45° around the center axis of the seamless steel pipe. As illustrated in FIG. 3, in the observation surface 100 of the test specimen, a length in a wall thickness direction is set as a wall thickness T (mm)−(a depth of 1.5 mm from an outer surface+a depth of 1.5 mm from an inner surface) by cutting off a region to the depth of 1.5 mm from the outer surface, and a region to the depth of 1.5 mm from the inner surface in the wall thickness direction of the seamless steel pipe. Further, a length of the observation surface 100 is set at 15 mm in the axial direction of the seamless steel pipe. That is, the observation surface 100 is formed into a rectangle of (the wall thickness T−3.0 mm)× 15 mm. The observation surfaces of the respective test specimens are mechanically polished. The observation surfaces after mechanically polished are etched by using a picral (Picral) etching reagent, and prior-austenite grain boundaries in the observation surfaces are caused to appear. Thereafter, by using an optical microscope with a magnifying power of 200 for each of the observation surfaces, in optional four visual fields (500 μm×500 μm per one visual field), an average value of grain size numbers of the prior-austenite grain is obtained in conformity with ASTM E112. The obtained average value is determined as the grain size number of the prior-austenite grain in each of the measurement positions. Out of the grain size numbers of the prior-austenite grain which are obtained in the respective measurement positions (40 spots in total), a smallest grain size number is defined as a grain size number conforming to ASTM E112 of the prior-austenite grain of the seamless steel pipe.

[Grain Size Difference ΔGS]

In the microstructure of the seamless steel pipe of the present embodiment, a difference between a maximum value and a minimum value of the grain size numbers measured in a plurality of optional portions, in the circumferential direction and the axial direction of the seamless steel pipe, in the main body region (the grain size difference ΔGS), is 1.0 or less. When the grain size difference ΔGS is more than 1.0, hydrogen intruding into the steel material causes embrittlement of coarse grain portions in a sour environment, and as a result, SSC resistance is reduced. When the grain size difference ΔGS is 1.0 or less, excellent SSC resistance can be obtained. In the present embodiment, by the pinning effect by Nb carbo-nitrides and Nb nitrides (hereinafter, referred to as Nb carbo-nitrides and the like) that are produced in the pipe-making step, grain is refined, and the grain size difference ΔGS can be made 1.0 or less. When Nb is not contained, grain is absolutely coarsened, and an influence of temperature variation in the axial direction and the circumferential direction of the pipe is also received, so that the grain size difference ΔGS becomes more than 1.0.

[Method for Measuring Grain Size Difference ΔGS]

The grain size difference ΔGS is measured by the following method. The maximum value and the minimum value are selected out of the grain size numbers in the 40 measuring positions where the grain size numbers were obtained, in the aforementioned method for measuring a prior-austenite grain size number. A difference from the maximum value to the minimum value is defined as the grain size difference ΔGS.

[Yield Strength YS and Tensile Strength Difference ΔTS]

The yield strength YS of the seamless steel pipe of the present embodiment is 655 MPa (95 ksi) to less than 862 MPa (125 ksi). If the yield strength YS is 862 MPa or more, excellent SSC resistance cannot be obtained even if the steel pipe has the aforementioned microstructure. On the other hand, if the yield strength is less than 655 MPa, strength required for use as oil country tubular goods for highly corrosive wells cannot be obtained. Accordingly, the yield strength YS of the seamless steel pipe of the present embodiment is 655 MPa to less than 862 MPa. The yield strength is defined as described above. That is, when the yield strength is in a 95 ksi grade (655 MPa to 758 MPa), the value of 0.5% total elongation is defined as the yield strength (MPa). When the yield strength is in a 110 ksi grade (758 MPa to less than 876 MPa), the value of 0.7% total elongation is defined as the yield strength (MPa). Definitions of these yield strengths are in conformity with the 5CT specifications of the API standards.

Further, in the main body region of the seamless steel pipe of the present embodiment, a difference (tensile strength difference) ΔTS between a maximum value and a minimum value of the tensile strength TS is 27.6 MPa or less. Therefore, in the seamless steel pipe of the present embodiment, strength variation is suppressed in the circumferential direction and the axial direction.

[Method for Measuring Yield Strength YS and Tensile Strength TS]

The yield strength YS and the tensile strength TS are measured by the following methods. The central positions in the axial direction of respective categories that are obtained by dividing the main body region excluding the first pipe end region and the second pipe end region of the seamless steel pipe, into five equal parts in the axial direction of the seamless steel pipe are selected. Strip-shaped tensile test specimens are extracted from four positions at positions of pitches of 90° around the center axis of the seamless steel pipe in each of the selected positions. A cross section (section perpendicular to the axial direction of the seamless steel pipe) of the strip-shaped tensile test specimen is strip-shaped, and an axial direction of the strip-shaped tensile test specimen is parallel with the axial direction of the seamless steel pipe. By using the strip-shaped tensile test specimens, a tensile test is carried out at a normal temperature (25° C.) in conformity with 5CT specifications of the API standards. An average of the yield strengths obtained in the respective strip-shaped test specimens (20 spots in total) is defined as the yield strength YS (MPa) of the seamless steal pipe. Further, a difference between a maximum value and a minimum value of the tensile strengths TS (20 spots) obtained in the respective strip-shaped test specimens is defined as a tensile strength difference ΔTS (MPa).

[Production Method]

An example of the method for producing the seamless steel pipe of the present embodiment will be described. Note that the method for producing the seamless steel pipe of the present embodiment is not limited to the method described later.

The present production method includes the step of heating a billet (heating step), the step of producing a hollow shell by using the heated billet (pipe-making step), a step of quenching the hollow shell which is produced by hot rolling, and has the outer surface temperature of the $A_3$ transformation point or more (the $Ac_3$ transformation point or more, or the $Ar_3$ transformation point or more) by rapidly cooling the hollow shell (quenching step), and the step of carrying out tempering to the quenched hollow shell (tempering step).

The present production method may include a concurrent heating step of carrying out reheating inline to the hollow shell after pipe-making which is the hollow shell having the outer surface temperature of less than the $Ac_3$ point to 400° C., between the pipe-making step and the quenching step. The present production method may also include a reheating step of carrying out reheating offline to the hollow shell after pipe-making which is the hollow shell having a temperature of less than 400° C. to a normal temperature (25° C.), between the pipe-making step and quenching step. The present method may also carry out the reheating step and the quenching step sequentially after the quenching step, and thereafter, may carry out the tempering step. The present production method may also carry out the reheating step, the quenching step and the tempering step sequentially, after the tempering step.

More specifically, the present production method is as follows, for example.

Case 1: heating step-pipe-making step-quenching step (direct quench)-tempering step Case 2: heating step-pipe-making step-concurrent-heating step-quenching step-tempering step Case 3: heating step-pipe-making step-reheating step-quenching step-tempering step Case 4: heating step-pipe-making step-concurrent-heating step-quenching step-reheating step-quenching step-tempering step Case 5: heating step-pipe-making step-reheating step-quenching step-reheating step-quenching step-tempering step Case 6: heating step-pipe-making step-(concurrent-heating step)-quenching step-tempering step-reheating step-quenching step-tempering step Case 7: heating step-pipe-making step-reheating step-quenching step-tempering step-reheating step-quenching step-tempering step Case 1 and case 2 correspond to so-called inline quenching. Case 3 corresponds to so-called offline quenching. Hereinafter, the respective steps will be described in detail.

[Heating Step]

First, a round billet having the aforementioned chemical composition is prepared. A method for producing the round billet is not specially limited. The round billet is produced by the following method, for example. A molten steel having the above described chemical composition is produced. In production of the molten steel, for example, a converter or the like is used. Bloom by a continuous casting process is produced by using the molten steel. Ingot may be produced by an ingot-making process by using the molten steel. The round billet circular in cross-section is produced by hot-rolling the bloom and the ingot. The round billet may be produced by the continuous casting process by using the molten steel. The round billet is prepared by the above method.

The prepared round billet is heated. A heating temperature is set at 950 to 1100° C. The heating temperature mentioned here means an in-furnace temperature of a heating furnace. When the in-furnace temperature is 950 to 1100° C., an outer surface temperature of the round billet is also 950 to 1100° C.

As illustrated in FIG. 1, when the heating temperature (the outer surface temperature of the round billet) of the round billet in the heating step is 1100° C. or less, the prior-austenite grain is kept in a fine state on the premise that the roll rotational frequency (roll circumferential speed) in the piercing step described later and the finishing temperature are satisfied. Consequently, an upper limit of the heating temperature of the round billet in the heating step is 1100° C. If the heating temperature of the round billet in the heating step is 1100° C. or less, variation in Nb solid solution rate in the axial direction and the circumferential direction of the hollow shell can be further suppressed, and an Nb solid solution rate difference ΔSR in the hollow shell before the tempering step after the quenching step can be suppressed to 10% or less. As a result, the tensile strength difference ΔTS in the main body region of the produced seamless steel pipe can be suppressed to 27.6 MPa or less. On the other hand, when the heating temperature of the round billet in the heating step is too low, deformation resistance of the round billet is enhanced. In this case, piercing and rolling become difficult. Accordingly, a lower limit of the heating temperature of the round billet in the heating step is 950° C. An upper limit of the heating temperature in the heating step is preferably 1080° C., and the lower limit is preferably 1050° C.

[Pipe-Making Step]

The round billet heated by the heating step is pierced and rolled to produce the hollow shell. The pipe-making step includes a piercing step and a rolling step. The rolling step includes an elongating step and a sizing step, for example. In the piercing step, the round billet is pierced and rolled by using a piercing mill to form the round billet into the hollow shell. In the elongating step, the hollow shell is elongated by using an elongating mill. The elongating mill is a plug mill, or a mandrel mill, for example. In the sizing step, the hollow shell is subjected to diameter adjusting rolling by using a sizing mill. The sizing mill is, for example, a sizer or a stretch reducer.

As described above, the outer surface temperature of the round billet (hollow shell) in the piercing step and the elongating step during the pipe-making step is 1100° C. or less. Further, the outer surface temperature (finishing temperature) of the hollow shell during final rolling (rolling in a final rolling reduction stand in the sizing step) is 1000° C. or less.

Specifically, the heating temperature of the round billet in the heating step is 1100° C. or less, and a maximum value of the outer surface temperature (finishing temperature) in the main body region of the hollow shell measured at a delivery side of the sizing mill is 1000° C. or less.

At the outlet side of the piercing mill, at the outlet side of the final rolling reduction stand of the elongating mill, and at the outlet side of the final rolling reduction stand of the sizing mill, radiation thermometers are located.

In the hollow shell passing through the delivery side of the piercing mill, the outlet side of the final rolling reduction stand of the elongating mill, and the outlet side of the final rolling reduction stand of the sizing mill, the outer surface temperatures of the portions corresponding to the main body region are measured by the radiation thermometers. The maximum temperature in the main body region of the measurement result from which noise is removed is defined as the outer surface temperature of the above described hollow shell at the outlet sides of the respective facilities (the piercing mill, the elongating mill, the sizing mill).

Even when the heating temperature of the round billet in the heating step is 950 to 1100° C. or less, if processing-incurred heat occurs in the round billet in the pipe-making step, portions having the outer surface temperature of more than 1100° C. occur in the main body region of the round billet (hollow shell) in the pipe-making step. In this case, fine Nb carbo-nitrides, Nb carbides and Nb nitrides which are generated in the pipe-making step are dissolved again. In this case, the pinning effect by the Nb carbo-nitrides, the Nb carbides and the Nb nitrides in which the Nb carbo-nitrides and the like are dissolved cannot be obtained, and austenite grain is not refined. As a result, the prior-austenite grain size in the main body region becomes less than 7.0, and the grain size difference ΔGS becomes more than 1.0. In this case, SSC resistance is reduced. Further, the Nb solid solution rate difference ΔSR in the hollow shell before the tempering step after the quenching step becomes more than 10%. As a result, the tensile strength difference ΔTS of the seamless steel pipe becomes more than 27.6 MPa, and strength variation increases.

In the pipe-making step, especially in the piercing step which is carried out directly after the round billet is heated, a rolling ratio is high. Therefore, processing-incurred heat is the most readily generated in the piercing step, out of the piercing step, the elongating step and the sizing step, and the outer surface temperature of the round billet (hollow shell) easily becomes more than 1100° C. in the piercing step. When the outer surface temperature of the hollow shell becomes more than 1100° C. in the piercing step, the outer surface temperature (finishing temperature) of the hollow shell at the outlet side of the sizing mill in the rolling step becomes more than 1000° C. In this case, the prior-austenite grain size number of the main body region becomes less than 7.0, the grain size difference ΔGS becomes more than 1.0, and the tensile strength difference ΔTS becomes more than 27.6 MPa.

Therefore, in this example, in the piercing step, the processing-incurred heat in the piercing step is suppressed by controlling the roll rotational frequency of the piercing mill, and the outer surface temperature of the round billet (hollow shell) in the pipe-making step is suppressed to 1100° C. or less. The piercing mill includes a plurality of (for example, a pair of) skew rolls, and a plug located between the plurality of skew rolls. In the present embodiment, roll diameters of the skew rolls of the piercing mill are set at 1390 to 1410 mm, and the rotational frequencies are set at 20 to 75 rpm. At this time, the circumferential speeds of the skew rolls are 1450 to 5550 mm/second. Note that the roll diameter of the skew roll means a roll diameter (mm) of a gorge portion of the skew roll.

When the rotational frequency of the skew roll is 75 rpm or less, even in the case where the round billet which is heated at 1100° C. or less is pierced and rolled in the piercing and rolling with a rolling ratio of 1.2 to 4.0, the outer surface temperature of the round billet in the piercing step can be restrained from rising to be higher than 1100° C. by the processing-incurred heat. Further, the hollow shell temperature (finishing temperature) during the final rolling in the sizing step becomes 1000° C. or less.

When the finishing temperature is too low, pipe making becomes difficult in the pipe-making step. Accordingly, a lower limit of the finishing temperature is 800° C. That is, the finishing temperature is 800 to 1000° C. The lower limit of the finishing temperature is preferably 850° C.

[Concurrent Heating Step]

The concurrent heating step is carried out in accordance with necessity. If the outer surface temperature (finishing temperature) of the hollow shell after hot rolling is less than the $A_3$ transformation point ($Ar_3$ transformation point), quenching cannot be carried out. However, if the outer surface temperature of the hollow shell after hot rolling is 400° C. or more, reheating does not have to be performed in the offline heating furnace, and the outer surface temperature of the hollow shell is raised to the $Ac_3$ transformation point or more by heating the hollow shell inline by using a holding furnace or an induction heater located on a conveyance path connecting the sizing mill and the quenching apparatus (rapidly cooling apparatus). An upper limit of the outer surface temperature of the hollow shell which is heated in the concurrent heating step is preferably the $Ac_3$ transformation point+50° C. The outer surface temperature of the hollow shell after heating in the concurrent heating step is referred to as a "concurrent heating temperature" in the present specification. The concurrent heating temperature is measured by the following method. When the concurrent heating step is carried out by using the induction heater, the average value of the outer surface temperature of the main body region of the hollow shell at the outlet side of the induction heater is defined as the concurrent heating temperature (° C.). In this case, the concurrent heating temperature is measured by a radiation thermometer located at the outlet side of the induction heater. On the other hand, when the concurrent heating step is carried out by using the concurrent heating furnace, a furnace temperature (° C.) of the concurrent heating furnace corresponds to the outer surface temperature of the main body region of the hollow shell. Therefore, in this case, the furnace temperature of the concurrent heating furnace is defined as the outer surface temperature (° C.) of the hollow shell.

[Reheating Step]

The reheating step is carried out in accordance with necessity. When the outer surface temperature of the hollow shell becomes less than 400° C. to the normal temperature (25° C.) as a result that the hollow shell after pipe-making is allowed to cool, the hollow shell is reheated by using the heating furnace located offline of the pipe making line. The outer surface temperature of the hollow shell which is heated by the reheating step is at the $Ac_3$ transformation point or more, and an upper limit is preferably the $Ac_3$ transformation point+50° C. The furnace temperature (° C.) of the heating furnace corresponds to the outer surface temperature of the main body region of the hollow shell. Therefore, when the heating furnace is used in the reheating step, the furnace temperature of the heating furnace is defined as the outer surface temperature (° C.) of the hollow shell.

When the reheating step is carried out to repeat the quenching step after the quenching step, or after the tempering step (case 4, case 5 and the like described above), reheating is carried out on the hollow shell in the same way as described above. In this case, the outer surface temperature of the hollow shell heated by the reheating step is at the $Ac_3$ transformation point or more, and an upper limit is preferably the $Ac_3$ transformation point+50° C.

[Quenching Step]

In the quenching step, the hollow shell having the outer surface temperature of the $A_3$ transformation point or more (the outer surface temperature of the hollow shell after the pipe-making step is at the $Ar_3$ transformation point or more, or when the concurrent heating step and the reheating step are carried out, the outer surface temperature of the hollow shell is at the $Ac_3$ transformation point or more) is rapidly cooled and quenched. The outer surface temperature (the quenching temperature) of the hollow shell at a start of rapid cooling in the quenching step is at the $A_3$ transformation point (the $Ar_3$ transformation point or the $Ac_3$ transformation point) to 1000° C. Here, the outer surface temperature of the hollow shell at the rapid cooling start time is the average value of the outer surface temperature of the main body region. Further, an average cooling rate CR until the outer surface temperature of the hollow shell reaches 300° C. from the outer surface temperature of the hollow shell at the rapid cooling start time in the quenching step is set at 15° C./second or more.

If the average cooling rate CR is too low, a ratio of martensite in the steel decreases, and a ratio of bainite increases. In this case, an area fraction of tempered martensite in the seamless steel pipe becomes less than 90%, and sufficient strength cannot be obtained. Therefore, the average cooling rate CR is set at 15° C./second or more. A lower limit of the average cooling rate CR is preferably 17° C./second, and more preferably 19° C./second. A rapid cooling method in the quenching step is preferably water cooling.

When so-called inline quenching represented by cases 1, 2, 4 and 6 is carried out, the quenching step is carried out by, for example, a water cooling device that is on the pipe-making line and is located downstream of the sizing mill. The water cooling device includes, for example, a laminar water flow device and a jet water flow device. The laminar water flow device pours water to the hollow shell from above. At this time, the water poured to the hollow shell forms a water flow in a laminar shape. The jet water flow device injects a jet water flow to an inside of the hollow shell from the end of the hollow shell. The water cooling device may be other devices than the laminar water flow device and the jet water flow device described above. The water cooling device may be a water tank, for example. In this case, the hollow shell is dipped into the water tank and cooled. The water cooling device also may be only the laminar water flow device.

When so-called offline quenching represented by cases 3, 5 and 7 is carried out, the quenching step is carried out by a water cooling device located outside the pipe making line, for example. The water cooling device is similar to the water cooling device which is used in inline quenching. When offline quenching is carried out, reverse transformation can be used, so that as compared with the case where only inline quenching is carried out, the grain size number of the prior-austenite grain of the seamless steel pipe becomes high.

[Nb Solid Solution Rate Difference ΔSR]

In the hollow shell after the first quenching step and before the subsequent step is carried out (before the tempering step when the subsequent step is the tempering step, and before the reheating step when the subsequent step is the reheating step, for example), a ratio of Nb dissolved in the steel without being precipitated as Nb carbo-nitrides and the like (Nb carbo-nitrides and Nb nitrides) to a total Nb content in the steel is defined as an Nb solid solution rate (mass %). In this case, a difference (hereinafter, referred to as the Nb solid solution rate difference ΔSR) between a maximum value and a minimum value of the Nb solid solution rate in the main body region of the hollow shell is 10% or less. When the Nb solid solution rate difference ΔSR is more than 10%, the difference (the tensile strength difference ΔTS) between the maximum value and the minimum value of the tensile strength TS measured in the main body region of the seamless steel pipe which is produced through the tempering step described later increases, and strength variation in the seamless steel pipe increases. When the Nb solid solution rate difference ΔSR is 10% or less, the tensile strength difference ΔTS decreases to 27.6 MPa or less, and strength variation in the circumferential direction and the axial direction of the seamless steel pipe is suppressed. Therefore, the seamless steel pipe of the present embodiment has stable high strength. In the present embodiment, the above described Nb solid solution rate difference is realized by performing pipe making at a lower temperature (1100° C. or less) than in the prior art in the aforementioned pipe-making step, and suppressing processing-incurred heat that is generated during the piercing and rolling.

[Method for Measuring Nb Solid Solution Rate Difference ΔSR]

The Nb solid solution rate of the hollow shell after the first quenching step before the subsequent step is measured by an extracted residue method. Specifically, the main body region excluding the first pipe end region and the second pipe end region of the hollow shell after the first quenching step before the subsequent step is divided into five equal parts in the axial direction of the hollow shell, and central positions in the hollow shell axial direction, of the respective categories are selected as measurement positions. In a section perpendicular to the axial direction of the hollow shell in each of the measurement positions, test specimens are extracted from wall thickness center positions of four positions at pitches of 90° around the center axis of the hollow shell. At this time, a surface area of the extracted test specimen is set as 15 cm$^2$. The test specimen is electrolyzed by an amount of 0.5 g in an electrolytic solution to dissolve a matrix. The electrolytic solution consists of 10% of acetylacetone+1% of tetramethylammonium chloride+the balance being methanol, and an electric current is 200 A/m$^2$. A residue (=precipitate) is filtered by a filter with a hole diameter of 0.2 μm, and the precipitate is extracted. The precipitate is acid-decomposed, a chemical composition is analyzed by ICP (inductively coupled plasma analysis), and an Nb content in the precipitate is obtained. Based on the Nb content in the precipitate, an Nb solid solution rate is obtained by the following formula.

Nb solid solution rate=(total Nb content in steel−Nb content in precipitate)/total Nb content in steel Of the obtained Nb solid solution rate, a maximum value and a minimum value are selected, and a difference between the maximum value and the minimum value is defined as the Nb solid solution rate difference ΔSR.

The Nb solid solution rate is measured in the hollow shell after the first quenching step, before the subsequent step, as described above.

[Tempering Step]

The hollow shell which is rapidly cooled and quenched in the quenching step is tempered to be made the seamless steel pipe. The tempering temperature is 650° C. to the Ac$_1$ transformation point, and is adjusted based on a desired mechanical property. Specifically, the tempering temperature is adjusted so that the yield strength of the seamless steel pipe after tempering becomes 655 MPa to less than 862 MPa. When the yield strength is 862 MPa or more, the grain size number is 7.0 or more, and even if the grain size number difference ΔGS is 1.0 or less, SSC resistance becomes low. When the yield strength is less than 862 MPa, SSC resistance is more enhanced. The tempering temperature for making the yield strength of the seamless steel pipe of the present embodiment of the aforementioned chemical composition 655 MPa to less than 862 MPa is 650° C. to the Ac$_1$ transformation point, and an upper limit is preferably 750° C.

Note that the tempering temperature (° C.) means an in-furnace temperature in the heat treatment furnace which is used in the tempering step. In the tempering step, the outer surface temperature of the hollow shell becomes the same as the tempering temperature (in-furnace temperature).

The seamless steel pipe produced by the above steps has excellent SSC resistance, and stably has the yield strength of 655 MPa to less than 862 MPa in the circumferential direction and the axial direction.

Example 1

A plurality of seamless steel pipes having various chemical compositions were produced, and SSC resistance and strength variations of the seamless steel pipes were investigated.

[Investigation Method]

Molten steels having chemical compositions shown in Table 1 were produced.

TABLE 1

| Steel grade | Chemical composition (mass %, balance being Fe and impurities) | | | | | | | | | | | | | | | Ac$_3$ transformation point | Ar$_3$ transformation point | Ac$_1$ transformation point |
| --- | --- | --- | --- | --- | --- | --- | --- | --- | --- | --- | --- | --- | --- | --- | --- | --- | --- | --- |
| | C | Si | Mn | P | S | Al | N | Cr | Mo | Nb | B | Ti | V | Ca | REM | | | |
| A | 0.26 | 0.28 | 0.46 | 0.009 | 0.001 | 0.035 | 0.004 | 1.00 | 0.34 | 0.028 | 0.0005 | 0.026 | 0 | 0 | 0 | 840 | 760 | 756 |
| B | 0.27 | 0.28 | 0.49 | 0.008 | 0.002 | 0.027 | 0.003 | 1.19 | 0.71 | 0.028 | 0.0012 | 0.017 | 0 | 0.0014 | 0.0013 | 844 | 766 | 762 |
| C | 0.26 | 0.33 | 0.44 | 0.008 | 0.001 | 0.032 | 0.003 | 0.61 | 1.21 | 0.032 | 0.0008 | 0.007 | 0.10 | 0.0011 | 0 | 860 | 770 | 770 |
| D | 0.31 | 0.26 | 0.41 | 0.014 | 0.003 | 0.025 | 0.004 | 0.72 | 1.01 | 0.032 | 0.0015 | 0.002 | 0.10 | 0.0011 | 0 | 832 | 770 | 760 |
| E | 0.27 | 0.17 | 0.64 | 0.007 | 0.002 | 0.027 | 0.003 | 0.59 | 0.30 | 0 | 0.0011 | 0.012 | 0.05 | 0 | 0 | 835 | 752 | 758 |
| F | 0.27 | 0.28 | 0.49 | 0.008 | 0.002 | 0.027 | 0.003 | 1.00 | 0.71 | 0.028 | 0.0012 | 0.012 | 0.07 | 0.001 | 0 | 845 | 765 | 760 |
| G | 0.33 | 0.28 | 0.49 | 0.008 | 0.002 | 0.027 | 0.003 | 1.00 | 0.80 | 0.028 | 0.0012 | 0.012 | 0.05 | 0.001 | 0 | 846 | 770 | 760 |
| H | 0.28 | 0.3 | 0.51 | 0.01 | 0.003 | 0.031 | 0.004 | 1.02 | 0.53 | 0.008 | 0.0005 | 0.013 | 0 | 0.0012 | 0 | 838 | 760 | 750 |

A plurality of round billets were produced by continuous casting by using the molten steels. Seamless steel pipes were produced under production conditions shown in Table 2 by using the round billets. In the present example, so-called inline quenching of case 1 and case 2 described above was carried out.

TABLE 2

| Test number | Steel grade | Heating temperature (° C.) | Roll rotational frequency (rpm) | Roll diameter (mm) | Circumferential speed (mm/s) | Finishing temperature (° C.) | Concurrent heating temperature (° C.) | Quenching temperature (° C.) |
|---|---|---|---|---|---|---|---|---|
| 1 | A | 950 | 54 | 1390 | 3930 | 880 | 940 | 920 |
| 2 | A | 1100 | 29 | 1390 | 2110 | 960 | N/A | 940 |
| 3 | B | 970 | 56 | 1390 | 4080 | 890 | 950 | 950 |
| 4 | B | 1050 | 33 | 1390 | 2400 | 940 | 950 | 940 |
| 5 | C | 970 | 57 | 1390 | 4150 | 900 | N/A | 870 |
| 6 | C | 1050 | 20 | 1390 | 1460 | 910 | 950 | 940 |
| 7 | D | 1000 | 30 | 1390 | 2180 | 860 | 940 | 920 |
| 8 | D | 950 | 75 | 1390 | 5460 | 950 | 950 | 940 |
| 9 | A | 1090 | 80 | 1390 | 5820 | 1020 | 950 | 940 |
| 10 | B | 1130 | 33 | 1390 | 2400 | 1020 | 950 | 940 |
| 11 | E | 1020 | 45 | 1390 | 3280 | 920 | 950 | 940 |
| 12 | H | 1050 | 50 | 1410 | 3690 | 970 | 950 | 940 |
| 13 | D | 970 | 80 | 1410 | 5910 | 1010 | 950 | 940 |
| 14 | B | 1010 | 80 | 1410 | 5910 | 1050 | 950 | 940 |
| 15 | B | 1000 | 60 | 1410 | 4430 | 940 | 950 | 940 |

| Test number | Tempering temperature (° C.) | Nb solid solution rate difference (%) | Grain size number | Grain size difference ΔGS | YS (MPa) | TS (MPa) | Strength difference ΔTS (MPa) | SSC resistance |
|---|---|---|---|---|---|---|---|---|
| 1 | 700 | 0 | 8.0 | 0.4 | 715.7 | 815.0 | 17.9 | Success |
| 2 | 700 | 10 | 7.4 | 0.5 | 718.4 | 827.4 | 26.9 | Success |
| 3 | 680 | 0 | 8.1 | 0.5 | 739.1 | 843.9 | 11.7 | Success |
| 4 | 690 | 7 | 7.7 | 0.4 | 700.5 | 806.0 | 22.1 | Success |
| 5 | 720 | 0 | 8.3 | 0.5 | 748.1 | 837.7 | 17.9 | Success |
| 6 | 710 | 4 | 8.1 | 0.6 | 780.5 | 868.2 | 20.9 | Success |
| 7 | 730 | 0 | 8.7 | 0.7 | 728.1 | 817.0 | 11.0 | Success |
| 8 | 725 | 8 | 7.9 | 0.7 | 758.9 | 843.9 | 21.2 | Success |
| 9 | 695 | 24 | 6.4 | 1.3 | 732.9 | 818.4 | 60.0 | Failure |
| 10 | 700 | 20 | 6.3 | 1.1 | 745.3 | 848.1 | 42.7 | Failure |
| 11 | 680 | 0 | 6.8 | 1.5 | 685.3 | 803.2 | 15.9 | Failure |
| 12 | 690 | 5 | 6.6 | 1.2 | 784.6 | 880.2 | 20.1 | Failure |
| 13 | 725 | 22 | 6.9 | 1.3 | 750.1 | 840.2 | 50.7 | Failure |
| 14 | 680 | 25 | 6.7 | 1.4 | 735.5 | 841.6 | 62.3 | Failure |
| 15 | 640 | 8 | 7.7 | 0.5 | 865.9 | 965.1 | 19.7 | Failure |

Specifically, the round billets of the respective test numbers were heated at heating temperatures (° C.) described in Table 2. The pipe-making step (the piercing step, the elongating step and the sizing step) was carried out on the heated round billets, and hollow shells each with an outer diameter of 244.5 mm and a wall thickness of 13.8 mm were produced. In the pipe-making step, the roll diameters of the skew rolls of the piercing mill were 1390 to 1410 mm. Specifically, the roll diameters of the skew rolls of the piercing mill of test numbers 1 to 11 were 1390 mm, and the roll diameters of the skew rolls of the piercing mill of test numbers 12 to 15 were 1410 mm. The roll rotational frequencies (rpm), the roll circumferential speeds (mm/second) and the finishing temperatures (° C.) at piercing of the piercing mill in the pipe-making step were as shown in Table 2.

The concurrent heating step was carried out at the concurrent heating temperatures shown in Table 2 to the hollow shells other than the hollow shells of test numbers 2 and 5, out of the produced hollow shells. Quenching was carried out by rapid cooling to the hollow shells after the pipe-making step (test numbers 2 and 5), or after the concurrent heating step. The rapid cooling start temperatures in the quenching step are as shown in Table 2, and all of the rapid cooling start temperatures were the $A_3$ transformation point or more. The average cooling rate CR until the outer surface temperature of the hollow shell reaches 300° C. from the rapid cooling start temperature in the quenching step was 15° C./second or more. Tempering was carried out on the hollow shells after the quenching step. The tempering temperatures were as shown in Table 2, and holding durations at the tempering temperatures were all 30 minutes. The tempering temperatures of all the test numbers were the $Ac_1$ transformation point or less. By the above production step, the seamless steel pipes of the respective test numbers were produced. Note that in the respective test numbers, in order to measure the Nb solid solution rate differences ΔSR, hollow shells before the tempering step after the quenching step were also prepared.

The chemical compositions of the seamless steel pipes of the respective test numbers corresponded to Table 1, as a result of carrying out well-known component analysis methods in the optional wall thickness central portions of the main body regions of the produced seamless steel pipes (a well-known infrared absorption method after combustion for C and S, a well-known high-temperature desorption gas analysis method for O and N, and an ICP analysis method for the other alloying elements).

[Nb Solid Solution Rate Difference ΔSR]

The main body region excluding the first pipe end region and the second pipe end region before the tempering step after the quenching step of each of the test numbers is divided into five equal parts in the axial direction of the hollow shell, and the central positions in the hollow shell axial direction of the respective categories were selected as the measurement positions. In the section perpendicular to the axial direction of the hollow shell in each of the measurement positions, test specimens were extracted from wall thickness central positions of four positions at pitches of 90° around the center axis of the hollow shell. At this time, a surface area of the extracted test specimen was set at 15 cm². The test specimens were each electrolyzed by an amount of 0.5 g in an electrolytic solution to dissolve matrix. The electrolytic solution consists of 10% of acetylaceton+ 1% of tetramethylammonium chloride+the balance being methanol, and a current was set at 200 A/m². A residue (=precipitate) was filtrated by a filter with a hole diameter of 0.2 μm, and the precipitate was extracted. The precipitate was acid-decomposed, the chemical composition was analyzed by ICP (inductively coupled plasma analysis), and the Nb content in the precipitate was obtained. Based on the Nb content in the precipitate, the Nb solid solution rate was obtained by the following formula.

Nb solid solution rate=(total Nb content in steel−Nb content in precipitate)/total Nb content in steel Out of the Nb solid solution rates obtained in the respective measurement positions (20 spots in total), the maximum value and the minimum value were selected, and the difference between the maximum value and the minimum value was defined as the Nb solid solution rate difference ΔSR.

[Prior-Austenite Grain Size Number and Grain Size Number Difference ΔGS Measurement Test]

The central positions in the axial direction of respective categories, in the case where the main body region excluding the first pipe end region and the second pipe end region was divided into five equal parts in the axial direction of the seamless steel pipe, in the seamless steel pipe of each of the test numbers, were selected as measurement positions. In each of the measurement positions, from wall thickness central positions in eight positions at pitches of 45° around the center axis of the seamless steel pipe, test specimens having surfaces (observation surfaces) parallel with the axial direction of the seamless steel pipe were produced. As illustrated in FIG. 3, in the observation surface 100 of the test specimen, the length in the wall thickness direction of the observation surface 100 was set as the wall thickness T (mm)−(depth of 1.5 mm from outer surface+depth of 1.5 mm from inner surface) by cutting off the region to the depth of 1.5 mm from the outer surface and the region to the depth of 1.5 mm from the inner surface in the wall thickness direction of the seamless steel pipe. Further, the length in the axial direction of the seamless steel pipe, of the observation surface 100 was made 15 mm. That is, the observation surface 100 was a rectangle of (wall thickness T−3.0 mm)× 15 mm. The observation surface of each of the test specimens was mechanically polished. The observation surface after mechanical polishing was etched by using a picral (Picral) corrosion reagent, and the prior-austenite grain boundary in the observation surface was caused to appear. Thereafter, the average value of the grain size number of the prior-austenite grain was obtained in conformity with ASTM E112 in optional four visual fields (500 μm×500 μm per one visual field) by using an optical microscope with a power of 200 for the observation surface, and was set as the grain size number of the prior-austenite grain in each of the measurement positions. Out of the grain size numbers of the prior-austenite grain obtained in the respective measurement positions (40 spots in total), the minimum grain size number was defined as the grain size number conforming to ASTM E112 of the prior-austenite grain of the seamless steel pipe. Further, the maximum value and the minimum value of the grain size numbers (40 spots in total) obtained in the respective measurement positions were selected, and the difference obtained by subtracting the minimum value from the maximum value was defined as the grain size difference ΔGS.

[Tensile Test]

In the respective categories obtained by dividing the main body region excluding the first pipe end region and the second pipe end region of the seamless steel pipe of each of the test numbers into five equal parts in the axial direction of the seamless steel pipe, the central positions in the axial direction of the seamless steel pipe were selected. Strip-shaped tensile test specimens were extracted from four positions at positions of pitches of 90° around the center axis of the seamless steel pipe in each of the selected positions. A cross-section (section perpendicular to the axial direction of the seamless steel pipe) of the strip-shaped tensile test specimen was strip-shaped, and an axial direction of the strip-shaped tensile test specimen was parallel with the axial direction of the seamless steel pipe. A tensile test was carried out at a normal temperature (25° C.) in conformity with 5CT specifications of the API standards, by using the strip-shaped tensile test specimens. An average of yield strengths (20 spots in total) obtained in the respective strip-shaped test specimens was defined as the yield strength YS (MPa) of the seamless steel pipe. An average of tensile strengths (20 spots in total) obtained in the respective strip-shaped test specimens was defined as the tensile strength TS (MPa) of the seamless steel pipe. A difference between a maximum value and a minimum value of the tensile strengths TS (20 spots) obtained in the respective strip-shaped test specimens was defined as the tensile strength difference ΔTS (MPa).

[SSC Resistance Test]

In the respective categories obtained by dividing the main body region excluding the first pipe end region and the second pipe end region of the seamless steel pipe of each of the test numbers into five equal parts in the axial direction of the seamless steel pipe, central positions in the axial direction of the seamless steel pipe were selected. Round bar test specimens were extracted from wall thickness central portions in four positions at the positions of pitches of 90° around the center axis of the seamless steel pipe in the respective selected positions. An axial direction of the round bar test specimen was parallel with the axial direction of the seamless steel pipe. An outside diameter of a parallel portion of the round bar test specimen was 6.35 mm, and a length of the parallel portion was 25.4 mm.

SSC resistance of the respective round bar test specimens were evaluated by a constant load test in accordance with NACE (National Association of Corrosion Engineers) TM0177A method. A test bath was 5% of sodium chloride+ 0.5% of acetic acid aqueous solution at a normal temperature in which 1 atm of hydrogen sulfide gas was saturated. Load stresses corresponding to 90% of actual yield strengths (AYS) of the respective round bar test specimens were loaded, and the respective round bar test specimens were immersed in the test bath for 720 hours. After 720 hours elapsed after the respective round bar test specimens were immersed, it was confirmed whether or not the respective round bar test specimens were broken off. When subsidiary fracture was not observed in any of the round bar test specimens (20 in total) of each of the test numbers, it was determined that SSC resistance of the steel was high (success). When subsidiary fracture was observed in any one of the round bar test specimens (20 in total) of each of the test numbers, it was determined that SSC resistance of the steel was low (failure).

[Test Result]

Table 2 shows the test result. In Table 2, "YS" denotes the yield strength YS (MPa), and "TS" denotes the tensile strength TS (MPa). In the "SSC resistance" column, the SSC resistance evaluation test result is written. "Success" means that subsidiary fracture was not observed in the round bar test specimen, and excellent SSC resistance was shown. "Failure" means that subsidiary fracture was observed in the round bar test specimen, and SSC resistance was low. When the obtained yield strength YS was in a 95 ksi grade (655 to less than 758 MPa) in each of the test numbers, when the yield ratio YR was 85.0% or more, and the obtained yield strength YS was in a 110 ksi grade (758 to 862 MPa), the yield ratio was 90.0% or more, and the area fractions of the tempered martensite were all 90% or more.

Referring to Table 2, in test numbers 1 to 8, the chemical compositions were appropriate, and the production conditions were also appropriate. Consequently, the yield strengths YS were 655 to less than 862 MPa. Further, the grain size numbers of the prior-austenite grain conforming to ASTM E112 in the seamless steel pipes were all 7.0 or more, and grain size differences ΔGS were 1.0 or less. Consequently, crack was not confirmed in any of test numbers 1 to 8, in the SSC resistance test, and excellent SSC resistance was obtained.

Further, in test numbers 1 to 8, the Nb solid solution rate differences ΔSR in the hollow shells before the temper step after the quenching step were all 10% or less. Therefore, the tensile strength differences ΔTS of the seamless steel pipes of the respective test numbers after the tempering step were 27.6 MPa or less, and stable strengths were able to be obtained in the seamless steel pipe circumferential direction and in the entire bodies.

On the other hand, in test number 9, the skew roll rotational frequency was more than 75 rpm, and the roll circumferential speed in the piercing step was more than 5550 mm/second. As a result, the finishing temperature of the hollow shell became more than 1000° C. Consequently, the grain size number conforming to ASTM E112 of the prior-austenite grain in the seamless steel pipe became less than 7.0, and further, the grain size number difference ΔGS became more than 1.0. As a result, SSC resistance was low.

Further, the Nb solid solution rate difference ΔSR became more than 10%. Therefore, the strength difference ΔTS became more than 27.6 MPa, strength varies in the circumferential direction and the axial direction of the seamless steel pipe, and stable strength was not able to be obtained.

In test number 10, the heating temperature of the round billet was too high. As a result, the finishing temperature of the hollow shell in the pipe-making step became more than 1000° C. Therefore, the grain number conforming to ASTM E112 of the prior-austenite grain in the seamless steel pipe became less than 7.0, and further, the grain number difference ΔGS became more than 1.0. As a result, SSC resistance was low. Further, the Nb solid solution difference ΔSR became more than 10%. Consequently, the strength difference ΔTS became more than 27.6 MPa, strength varied in the circumferential direction and in the axial direction of the seamless steel pipe, and stable strength was not able to be obtained.

In test number 11, Nb was not contained. Therefore, the grain number conforming to ASTM E112 of the prior-austenite grain in the seamless steel pipe was less than 7.0, and the grain size difference ΔGS became more than 1.0. Therefore, SSC resistance was low.

In test number 12, the Nb content was too low. Therefore, the grain size number of the prior austenite grain conforming to ASTM E112 in the seamless steel pipe was less than 7.0. Consequently, SSC resistance was low.

In test numbers 13 and 14, the skew roll rotational frequencies were more than 75 rpm, and the roll circumferential speeds in the piercing step became more than 5550 mm/second, as in test number 9. As a result, the finishing temperatures of the hollow shells became more than 1000° C. Consequently, the grain size numbers conforming to ASTM E112 of the prior-austenite grains in the seamless steel pipes became less than 7.0, and further, the grain number differences ΔGS became more than 1.0. As a result, SSC resistance was low. Further, the Nb solid solution differences ΔSR became more than 10%. Consequently, the strength differences ΔTS became more than 27.6 MPa, the strengths varied in the circumferential directions and in the axial directions of the seamless steel pipes, and stable strengths were not be able to be obtained.

In test number 15, the tempering temperature was less than 650° C. and too low. Therefore, the yield strength became 862 MPa or more. As a result, crack was confirmed in the SSC resistance test, and SSC resistance was low.

Example 2

Under the same conditions as in example 1, a plurality of round billets were produced by continuous casting by using the molten steels shown in Table 1. Seamless steel pipes were produced under production conditions shown in Table 3 by using the round billets.

TABLE 3

| Test number | Steel grade | Heating temperature (° C.) | Roll rotational frequency (rpm) | Roll diameter (mm) | Circumferential speed (mm/s) | Finishing temperature (° C.) | Concurrent heating temperature (° C.) | Quenching temperature QT1 (° C.) | Tempering temperature TT1 (° C.) |
|---|---|---|---|---|---|---|---|---|---|
| 16 | B | 1050 | 20 | 1390 | 1460 | 850 | 940 | 900 | 700 |
| 17 | B | 1050 | 33 | 1390 | 2400 | 950 | N/A | 970 | 700 |
| 18 | B | 1050 | 50 | 1390 | 3640 | 960 | N/A | 960 | 700 |
| 19 | B | 1050 | 80 | 1390 | 5820 | 1070 | N/A | 930 | 700 |
| 20 | B | 1130 | 70 | 1390 | 5090 | 1120 | N/A | 980 | 700 |

TABLE 3-continued

| | | | | | | | | | | |
|---|---|---|---|---|---|---|---|---|---|---|
| 21 | C | 1050 | 33 | 1410 | 2440 | 930 | N/A | | 890 | 710 |
| 22 | D | 1050 | 33 | 1410 | 2440 | 940 | N/A | | 900 | 705 |
| 23 | B | 1050 | 40 | 1410 | 2950 | 930 | N/A | | 920 | 700 |

| Test number | Reheating quenching temperature QT2 (° C.) | Tempering temperature TT2 (° C.) | Nb solid solution rate difference ΔSR (%) | Grain size number | Grain size difference ΔGS | YS (MPa) | TS (MPa) | Strength difference ΔTS (MPa) | SSC resistance |
|---|---|---|---|---|---|---|---|---|---|
| 16 | 900 | 685 | 0 | 11.3 | 0.3 | 825 | 897 | 8.0 | Success |
| 17 | 870 | 690 | 9 | 11.2 | 0.3 | 830 | 893 | 23.0 | Success |
| 18 | 900 | 685 | 10 | 11.1 | 0.5 | 815 | 890 | 21.0 | Success |
| 19 | 880 | 680 | 24 | 9.2 | 1.1 | 855 | 925 | 28.0 | Failure |
| 20 | 880 | 680 | 28 | 8.9 | 1.5 | 849 | 920 | 32.0 | Failure |
| 21 | 880 | 710 | 5 | 11.5 | 0.3 | 830 | 897 | 6.0 | Success |
| 22 | 880 | 705 | 7 | 11.3 | 0.4 | 827 | 900 | 10.0 | Success |
| 23 | 890 | 640 | 5 | 11.2 | 0.4 | 864 | 929 | 15.0 | Failure |

Specifically, the round billets in the respective test numbers were heated at heating temperatures (° C.) written in Table 3. To the heated round billets, the pipe-making step (the piercing step, the elongating step and the sizing step) was carried out, and hollow shells each with an outer diameter of 244.5 mm, and a wall thickness of 13.8 mm were produced. In the pipe-making step, roll diameters of the skew rolls of the piercing mills were 1390 to 1410 mm. Specifically, the roll diameters of the skew rolls of the piercing mills of test numbers 16 to 20 were 1390 mm, and roll diameters of the skew rolls of the piercing mills of test numbers 21 to 23 were 1410 mm. Roll rotational frequencies (rpm), roll circumferential speeds (mm/second) and finishing temperatures (° C.) at the piercing of the piercing mills in the pipe-making step were as shown in Table 3.

Concurrent heating was performed at the concurrent heating temperature shown in Table 3 before the quenching step, to the hollow shell of test number 16, out of the hollow shells after the pipe-making step. Quenching (inline quenching) was carried out by rapid cooling to the hollow shells after the pipe-making step (test numbers 17 to 23), or after the concurrent heating step (test number 16). Rapid cooling start temperatures (quenching temperatures) QT1 in the quenching step were as shown in Table 3, and were all the $A_3$ transformation point or more. Average cooing rates CR until the outer surface temperatures of the hollow shells reached 300° C. from the rapid cooing start temperatures QT1 in the quenching step were 15° C./second or more. Tempering was carried out on the hollow shells after the quenching step. Tempering temperatures TT1 were as shown in Table 3, and holding durations at the tempering temperatures TT1 were all 30 minutes. The tempering temperatures TT1 of all the test numbers were $Ac_1$ transformation point or less. The hollow shells after tempering were allowed to cool to a normal temperature (25° C.).

The hollow shells at a normal temperature were heated to reheating quenching temperatures QT2 (° C.) shown in Table 3, and quenching (offline quenching) was carried out by rapidly cooling the hollow shells at the reheating temperatures. The rapid cooling start temperatures in the quenching step were the same as the reheating quenching temperatures QT2 shown in Table 3. The average cooling rates CR until the outer surface temperatures of the hollow shells reached 300° C. from the rapid cooling start temperatures QT2 in the quenching step were 15° C./second or more. Tempering was carried out on the hollow shells after offline quenching. Tempering temperatures TT2 were as shown in Table 3, and holding durations at the tempering temperatures TT2 were all 30 minutes. The tempering temperatures TT2 of all of test numbers were the $Ac_1$ transformation point or less. By the above production step, the seamless steel pipes of the respective test numbers were produced. In the respective test numbers, hollow shells before the first tempering step after the inline quenching step were also prepared to measure the Nb solid solution rate differences ΔSR.

The chemical compositions of the seamless steel pipes of the respective test numbers corresponded to Table 1, as a result of carrying out well-known component analysis methods in the optional wall thickness central portions of the main body regions of the produced seamless steel pipes (a well-known infrared absorption method after combustion for C and S, a well-known high-temperature desorption gas analysis method for O and N, and an ICP analysis method for the other alloying elements).

By using the seamless steel pipes of the respective test numbers, the grain sizes of the prior-austenite grains conforming to ASTM E112, the grain size differences ΔGS, the yield strengths YS (MPa), the tensile strengths TS (MPa) and the tensile strength differences ΔTS (MPa) were obtained as in example 1. Further, the SSC resistance test was carried out as in example 1. Further, to the hollow shells before the first tempering step after the inline quenching step of the respective test numbers, the Nb solid solution rate differences ΔSR were obtained as in example 1.

[Test Result]

Table 3 shows the test result. In the respective test numbers, the obtained yield strengths YS were in a 110 ksi grade (758 to 862 MPa), yield ratios YR were 90.0% or more, and area fractions of tempering martensite were all 90% or more. Referring to Table 3, in test numbers 16 to 18, 21 and 22, the chemical compositions were appropriate, and the production conditions were also appropriate. Therefore, the grain size numbers conforming to ASTM E112 of the prior-austenite grains of the seamless steel pipes were all 7.0 or more, and the grain size differences ΔGS were 1.0 or less. Consequently, excellent SSC resistances were obtained in both of the axial direction and the circumferential direction of the seamless steel pipes.

Further, in these test numbers, the Nb solid solution rate differences ΔSR were all 10% or less. Consequently, the tensile strength differences ΔTS were 27.6 MPa or less, and stable strengths were obtained in the circumferential direction and the axial direction of the seamless steel pipes.

In test numbers 16 to 18, 21 and 22, offline quenching was carried out after inline quenching. Therefore, as compared with test numbers 1 to 8 for which only inline quenching was carried out, the grain size numbers conforming to ASTM E112 of the prior-austenite grains of the seamless steel pipes became higher.

On the other hand, in test number 19, the roll rotational frequency (and the roll circumferential speed) was too high, and as a result, the finishing temperature became more than 1000° C. Therefore, the Nb solid solution rate difference ΔSR in the hollow shell before the first tempering step after the inline quenching step became more than 10%. Therefore, the tensile strength difference ΔTS became more than 27.6 MPa, and stable strength in the circumferential direction and the axial direction of the seamless steel pipe was not obtained. Further, in test number 19, the grain size difference ΔGS became more than 1.0. Therefore, crack was confirmed in the SSC resistance test, and SSC resistance was low.

In test number 20, the heating temperature of the round billet was too high. As a result, the finishing temperature of the hollow shell in the pipe-making step became more than 1000° C. Therefore, the Nb solid solution rate difference ΔSR in the hollow shell before the first tempering step after the inline quenching step became more than 10%. Therefore, the tensile strength difference ΔTS became more than 27.6 MPa, and stable strength was not able to be obtained in the circumferential direction and the axial direction of the seamless steel pipe. Further in test number 20, the grain size difference ΔGS became more than 1.0. Consequently, crack was confirmed in the SSC resistance test, and SSC resistance was low.

In test number 23, the final (the second) tempering temperature TT2 was less than 650° C. and too low. Therefore, the yield strength became 862 MPa or more. As a result, crack was confirmed in the SSC resistance test, and SSC resistance was low.

Example 3

Under the same conditions as in example 1, a plurality of round billets were produced by continuous casting by using the molten steels shown in Table 1. Seamless steel pipes were produced under the production conditions shown in Table 4 by using the round billets.

TABLE 4

| Test number | Steel grade | Heating temperature (° C.) | Roll rotational frequency (rpm) | Roll diameter (mm) | Circumferential speed (mm/s) | Finishing temperature (° C.) | Concurrent heating temperature (° C.) | Quenching temperature QT1 (° C.) | Tempering temperature TT1 (° C.) |
|---|---|---|---|---|---|---|---|---|---|
| 24 | F | 1050 | 20 | 1390 | 1460 | 850 | N/A | N/A | N/A |
| 25 | F | 1050 | 33 | 1390 | 2400 | 950 | N/A | N/A | N/A |
| 26 | F | 1050 | 55 | 1390 | 4000 | 950 | N/A | N/A | N/A |
| 27 | F | 1050 | 80 | 1390 | 5820 | 1070 | N/A | N/A | N/A |
| 28 | F | 1130 | 70 | 1390 | 5090 | 1120 | N/A | N/A | N/A |
| 29 | G | 980 | 20 | 1410 | 1480 | 830 | N/A | N/A | N/A |
| 30 | G | 980 | 33 | 1410 | 2440 | 900 | N/A | N/A | N/A |
| 31 | G | 980 | 50 | 1410 | 3690 | 960 | N/A | N/A | N/A |
| 32 | G | 1050 | 80 | 1410 | 5910 | 1080 | N/A | N/A | N/A |

| Test number | Reheating quenching temperature QT2 (° C.) | Tempering temperature TT2 (° C.) | Nb solid solution rate difference ΔSR (%) | Grain size number | Grain size difference ΔGS | YS (MPa) | TS (MPa) | Strength difference ΔTS (MPa) | SSC resistance |
|---|---|---|---|---|---|---|---|---|---|
| 24 | 900 | 700 | 0 | 10.2 | 0.3 | 825 | 897 | 8.0 | Success |
| 25 | 870 | 700 | 6 | 10.0 | 0.3 | 830 | 893 | 20.0 | Success |
| 26 | 900 | 710 | 8 | 9.6 | 0.5 | 815 | 890 | 24.0 | Success |
| 27 | 880 | 700 | 19 | 8.6 | 1.3 | 861 | 925 | 28.0 | Failure |
| 28 | 880 | 700 | 26 | 8.3 | 1.6 | 853 | 918 | 31.0 | Failure |
| 29 | 900 | 700 | 0 | 11.0 | 0.3 | 825 | 897 | 8.0 | Success |
| 30 | 870 | 700 | 0 | 10.5 | 0.3 | 830 | 893 | 11.0 | Success |
| 31 | 900 | 710 | 10 | 10.1 | 0.4 | 815 | 890 | 26.0 | Success |
| 32 | 880 | 700 | 20 | 8.6 | 1.3 | 860 | 946 | 30.0 | Failure |

Specifically, the round billets of the respective test numbers were heated at heating temperatures (° C.) written in Table 4. To the heated round billets, the pipe-making step (the piercing step, the elongating step and the sizing step) was carried out, and hollow shells each with an outer diameter of 244.5 mm, and a wall thickness of 13.8 mm were produced. In the pipe-making step, roll diameters of the skew rolls of the piercing mills were 1390 to 1410 mm. Specifically, the roll diameters of the skew rolls of the piercing mills of test numbers 24 to 28 were 1390 mm, and roll diameters of the skew rolls of the piercing mills of test numbers 29 to 32 were 1410 mm. Roll rotational frequencies (rpm), roll circumferential speeds (mm/second) and finishing temperatures (° C.) at the piercing of the piercing mills in the pipe-making step were as shown in Table 4.

In the present example, in all of the test numbers, the hollow shells after the pipe-making step were allowed to cool to a normal temperature (25° C.). The hollow shells at a normal temperature were heated to reheating quenching temperatures QT2 (° C.) shown in Table 4, and quenching (offline quenching) was carried out by rapidly cooling the hollow shells at the reheating temperatures. The rapid cooling start temperatures in the quenching step were the same as the reheating quenching temperatures QT2 shown in Table 4. The average cooling rates CR until the outer surface temperatures of the hollow shells reached 300° C. from the rapid cooling start temperatures QT2 in the quenching step were 15° C./second or more. Tempering was carried out on the hollow shells after offline quenching. Tempering temperatures TT2 were as shown in Table 4, and holding durations at the tempering temperatures TT2 were all 30 minutes. The tempering temperatures TT2 of all of the test numbers were the $Ac_1$ transformation point or less. By the above production step, the seamless steel pipes of the respective test numbers were produced. In the respective test numbers, hollow shells before the tempering step after the offline quenching step were also prepared to measure the Nb solid solution rate differences ΔSR.

The chemical compositions of the seamless steel pipes of the respective test numbers corresponded to Table 1, as a result of carrying out well-known component analysis methods in the optional wall thickness central portions of the main body regions of the produced seamless steel pipes (a well-known infrared absorption method after combustion for C and S, a well-known high-temperature desorption gas analysis method for 0 and N, and an ICP analysis method for the other alloying elements).

By using the seamless steel pipes of the respective test numbers, the grain sizes of the prior-austenite grain numbers conforming to ASTM E112, the grain size differences ΔGS, the yield strengths YS (MPa), the tensile strengths TS (MPa) and the tensile strength differences ΔTS (MPa) were obtained as in example 1. Further, an SSC resistance test was carried out as in example 1.

Further, to the hollow shells before the tempering step after the offline quenching step of the respective test numbers, the Nb solid solution rate differences ΔSR were obtained as in example 1.

[Test Result]

Table 4 shows the test result. In the respective test numbers, the obtained yield strengths YS were in a 110 ksi grade (758 to 862 MPa), yield ratios YR were 90.0% or more, and area fractions of tempering martensite were all 90% or more. Referring to Table 4, in test numbers 24 to 26, and 29 to 31, the chemical compositions were appropriate, and the production conditions were also appropriate. Therefore, the grain size numbers of the prior-austenite grains conforming to ASTM E112 of the seamless steel pipes were all 7.0 or more, and the grain size differences ΔGS were 1.0 or less. Consequently, excellent SSC resistances were obtained in both of the axial direction and the circumferential direction of the seamless steel pipes.

Further, in these test numbers, the Nb solid solution rate differences ΔSR were all 10% or less. Consequently, the tensile strength differences ΔTS were 27.6 MPa or less, and stable strengths were obtained in the circumferential direction and the axial direction of the seamless steel pipes.

In test numbers 24 to 26, and 29 to 31, offline quenching was carried out and grain refinement by reverse transformation was performed. Therefore, as compared with test numbers 1 to 8 for which only inline quenching was carried out, the grain size numbers of the prior-austenite grains conforming to ASTM E112 of the seamless steel pipes became higher.

On the other hand, in test number 27, 28 and 32, the finishing temperatures were more than 1000° C. Therefore, in the seamless steel pipes after being produced, the grain size differences ΔGS became more than 1.0. Therefore, crack was confirmed in the SSC resistance test, and SSC resistance was low.

Further, in these test numbers, the Nb solid solution rate differences ΔSR in the hollow shells before the tempering step after the offline quenching step became more than 10%. Therefore, the tensile strength differences ΔTS became more than 27.6 MPa, and stable strength was not able to be obtained in the circumferential direction and the axial direction of the seamless steel pipe.

The embodiment of the present invention is described thus far. However, the aforementioned embodiment is only illustration for carrying out the present invention. Accordingly, the present invention can be carried out by properly changing the aforementioned embodiment within the range without departing from the gist of the present invention without being limited by the aforementioned embodiment.

The invention claimed is:

1. A seamless steel pipe having a first pipe end and a second pipe end,
   the seamless steel pipe having a chemical composition consisting of in mass %,
   C: 0.21 to 0.35%,
   Si: 0.10 to 0.50%,
   Mn: 0.05 to 1.00%,
   P: 0.025% or less,
   S: 0.010% or less,
   Al: 0.005 to 0.100%,
   N: 0.010% or less,
   Cr: 0.05 to 1.50%,
   Mo: 0.10 to 1.50%,
   Nb: 0.010 to 0.050%,
   B: 0.0003 to 0.0050%,
   Ti: 0.002 to 0.050%,
   V: 0 to 0.30%,
   Ca: 0 to 0.0050%, and
   rare earth metal: 0 to 0.0050%, the balance being Fe and impurities,
   in the seamless steel pipe, a grain size number of prior-austenite grain conforming to ASTM E112 is 7.0 or more in a main body region excluding a first pipe end region and a second pipe end region, the first pipe end region ranging to a position 500 mm away from the first pipe end in an axial direction of the seamless steel pipe toward the second pipe end, the second pipe end region ranging to a position 500 mm away from the second pipe end in an axial direction of the seamless steel pipe toward the first pipe end, in the main body region, a difference between a maximum value and a minimum value of the grain size number is 1.0 or less, in the main body region, yield strength is 655 to less than 862 MPa, and in the main body region, a difference between a maximum value and a minimum value of tensile strength is 27.6 MPa or less.

2. The seamless steel pipe according to claim 1, containing
V: 0.01 to 0.30%.

3. The seamless steel pipe according to claim 2, containing one or more elements selected from a group consisting of
Ca: 0.0001 to 0.0050%, and
rare earth metal: 0.0001 to 0.0050%.

4. The seamless steel pipe according to claim 1, containing one or more elements selected from a group consisting of
Ca: 0.0001 to 0.0050%, and
rare earth metal: 0.0001 to 0.0050%.

5. A method for producing the seamless steel pipe according to claim 1, comprising:
a step of heating a round billet to 950 to 1100° C., the round billet consisting of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb: 0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities;
a pipe-making step of piercing and rolling the round billet by using a piercing mill having skew rolls, rotational frequencies of the skew rolls being set at 20 to 75 rpm, and further carrying out rolling to produce a hollow shell, wherein a temperature of the hollow shell during final rolling is 800 to 1000° C.;
a quenching step of rapidly cooling the hollow shell produced in the pipe-making step and having an outer surface temperature of an $A_3$ transformation point to 1000° C., wherein an average cooling rate until the outer surface temperature reaches 300° C. from the outer surface temperature of the hollow shell at a start of rapid cooling is 15° C./second or more; and
a tempering step of carrying out tempering by holding the outer surface temperature of the hollow shell that has been rapidly cooled in the quenching step at a temperature ranging from 650° C. to an $Ac_1$ transformation point to produce a seamless steel pipe having yield strength of 655 to less than 862 MPa.

6. The method for producing the seamless steel pipe according to claim 5, further comprising:
a concurrent heating step of heating, after the pipe-making step before the quenching step, the hollow shell produced in the pipe-making step and having the outer surface temperature of 400° C. to less than an Ar₃ transformation point to the $Ac_3$ transformation point to 1000° C. in the outer surface temperature of the hollow shell,
wherein in the quenching step, the hollow shell heated in the concurrent heating step to have the outer surface temperature reaching the $A_3$ transformation point to 1000° C. is rapidly cooled.

7. The method for producing the seamless steel pipe according to claim 6,
wherein the round billet contains
V: 0.01 to 0.30%.

8. The method for producing the seamless steel pipe according to claim 6,
wherein the round billet contains one or more elements selected from a group consisting of
Ca: 0.0001 to 0.0050%, and
rare earth metal: 0.0001 to 0.0050%.

9. The method for producing the seamless steel pipe according to claim 7,
wherein the round billet contains one or more elements selected from a group consisting of
Ca: 0.0001 to 0.0050%, and
rare earth metal: 0.0001 to 0.0050%.

10. The method for producing the seamless steel pipe according to claim 5, further comprising:
a reheating step of reheating, after the pipe-making step before the quenching step, the hollow shell produced in the pipe-making step and having the outer surface temperature of less than 400° C. to the $Ac_3$ transformation point to 1000° C. in the outer surface temperature of the hollow shell,
wherein in the quenching step, the hollow shell heated in the reheating step to have the outer surface temperature reaching the $A_3$ transformation point to 1000° C. is rapidly cooled.

11. The method for producing the seamless steel pipe according to claim 10,
wherein the round billet contains
V: 0.01 to 0.30%.

12. The method for producing the seamless steel pipe according to claim 10,
wherein the round billet contains one or more elements selected from a group consisting of
Ca: 0.0001 to 0.0050%, and
rare earth metal: 0.0001 to 0.0050%.

13. The method for producing the seamless steel pipe according to claim 11,
wherein the round billet contains one or more elements selected from a group consisting of
Ca: 0.0001 to 0.0050%, and
rare earth metal: 0.0001 to 0.0050%.

14. The method for producing the seamless steel pipe according to claim 5,
wherein the round billet contains
V: 0.01 to 0.30%.

15. The method for producing the seamless steel pipe according to claim 14,
wherein the round billet contains one or more elements selected from a group consisting of
Ca: 0.0001 to 0.0050%, and
rare earth metal: 0.0001 to 0.0050%.

16. The method for producing the seamless steel pipe according to claim 5,
wherein the round billet contains one or more elements selected from a group consisting of
Ca: 0.0001 to 0.0050%, and
rare earth metal: 0.0001 to 0.0050%.

17. A method for producing the seamless steel pipe according to claim 1, comprising:
a step of heating a round billet to 950 to 1100° C., the round billet consisting of in mass %, C: 0.21 to 0.35%, Si: 0.10 to 0.50%, Mn: 0.05 to 1.00%, P: 0.025% or less, S: 0.010% or less, Al: 0.005 to 0.100%, N: 0.010% or less, Cr: 0.05 to 1.50%, Mo: 0.10 to 1.50%, Nb:

0.010 to 0.050%, B: 0.0003 to 0.0050%, Ti: 0.002 to 0.050%, V: 0 to 0.30%, Ca: 0 to 0.0050%, and rare earth metal: 0 to 0.0050%, the balance being Fe and impurities;

a pipe-making step of piercing the round billet by using a piercing mill having skew rolls, circumferential speeds of the skew rolls being set at 1450 to 5550 mm/second, and further carrying out rolling to produce a hollow shell, wherein a temperature of the hollow shell during final rolling is 800 to 1000° C.;

a quenching step of rapidly cooling the hollow shell produced in the pipe-making step and having an outer surface temperature of an $A_3$ transformation point to 1000° C., wherein an average cooling rate until the outer surface temperature reaches 300° C. from the outer surface temperature of the hollow shell at a start of rapid cooling is 15° C./second or more; and a tempering step of carrying out tempering by holding the outer surface temperature of the hollow shell that has been rapidly cooled in the quenching step at a temperature ranging from 650° C. to the $Ac_1$ transformation point to produce a seamless steel pipe having yield strength of 655 to less than 862 MPa.

18. The method for producing the seamless steel pipe according to claim 17, further comprising:

a concurrent heating step of heating, after the pipe-making step before the quenching step, the hollow shell produced in the pipe-making step and having the outer surface temperature of 400° C. to less than an Ar$_3$ transformation point to the Ac$_3$ transformation point to 1000° C. in the outer surface temperature of the hollow shell, wherein in the quenching step, the hollow shell heated in the concurrent heating step to have the outer surface temperature reaching the A$_3$ transformation point to 1000° C. is rapidly cooled.

19. The method for producing the seamless steel pipe according to claim 18, wherein the round billet contains
V: 0.01 to 0.30%.

20. The method for producing the seamless steel pipe according to claim 18, wherein the round billet contains one or more elements selected from a group consisting of
Ca: 0.0001 to 0.0050%, and
rare earth metal: 0.0001 to 0.0050%.

21. The method for producing the seamless steel pipe according to claim 19, wherein the round billet contains one or more elements selected from a group consisting of
Ca: 0.0001 to 0.0050%, and
rare earth metal: 0.0001 to 0.0050%.

22. The method for producing the seamless steel pipe according to claim 17, further comprising:

a reheating step of reheating, after the pipe-making step before the quenching step, the hollow shell produced in the pipe-making step and having the outer surface temperature of less than 400° C. to the Ac$_3$ transformation point to 1000° C. in the outer surface temperature of the hollow shell, wherein in the quenching step, the hollow shell heated in the reheating step to have the outer surface temperature reaching the A$_3$ transformation point to 1000° C. is rapidly cooled.

23. The method for producing the seamless steel pipe according to claim 22, wherein the round billet contains
V: 0.01 to 0.30%.

24. The method for producing the seamless steel pipe according to claim 22, wherein the round billet contains one or more elements selected from a group consisting of
Ca: 0.0001 to 0.0050%, and
rare earth metal: 0.0001 to 0.0050%.

25. The method for producing the seamless steel pipe according to claim 23, wherein the round billet contains one or more elements selected from a group consisting of
Ca: 0.0001 to 0.0050%, and
rare earth metal: 0.0001 to 0.0050%.

26. The method for producing the seamless steel pipe according to claim 17, wherein the round billet contains
V: 0.01 to 0.30%.

27. The method for producing the seamless steel pipe according to claim 26, wherein the round billet contains one or more elements selected from a group consisting of
Ca: 0.0001 to 0.0050%, and
rare earth metal: 0.0001 to 0.0050%.

28. The method for producing the seamless steel pipe according to claim 17, wherein the round billet contains one or more elements selected from a group consisting of
Ca: 0.0001 to 0.0050%, and
rare earth metal: 0.0001 to 0.0050%.

\* \* \* \* \*

UNITED STATES PATENT AND TRADEMARK OFFICE
CERTIFICATE OF CORRECTION

PATENT NO. : 11,313,005 B2
APPLICATION NO. : 16/301558
DATED : April 26, 2022
INVENTOR(S) : Atsushi Soma et al.

It is certified that error appears in the above-identified patent and that said Letters Patent is hereby corrected as shown below:

In the Specification

In Column 9, Line 32:
Please delete:
"Ara"
And insert:
--$Ar_3$--

In Column 16, Line 1:
Please delete:
"Ara"
And insert:
--$Ar_3$--

In the Claims

In Column 35, Claim 6, Line 60:
Please delete:
"Ara"
And insert:
--$Ar_3$--

In Column 37, Claim 18, Line 29:
Please delete:
"Ara"
And insert:
--$Ar_3$--

Signed and Sealed this
Twelfth Day of July, 2022

Katherine Kelly Vidal
*Director of the United States Patent and Trademark Office*